US012645348B2

(12) United States Patent
Gottstein

(10) Patent No.: US 12,645,348 B2
(45) Date of Patent: Jun. 2, 2026

(54) AUTOMATIC INCIDENT COMPILATION SYSTEM

(71) Applicant: GTEL Advisors, LLC, Plymouth, MN (US)

(72) Inventor: Jeffrey D. Gottstein, Plymouth, MN (US)

(73) Assignee: GTEL Advisors, LLC, Plymouth, MN (US)

( * ) Notice: Subject to any disclaimer, the term of this patent is extended or adjusted under 35 U.S.C. 154(b) by 246 days.

(21) Appl. No.: 18/307,321

(22) Filed: Apr. 26, 2023

(65) Prior Publication Data

US 2023/0350549 A1 Nov. 2, 2023

Related U.S. Application Data

(60) Provisional application No. 63/336,937, filed on Apr. 29, 2022.

(51) Int. Cl.

| | |
|---|---|
| ***G06F 3/048*** | (2013.01) |
| ***G06F 3/0484*** | (2022.01) |
| *G10L 15/26* | (2006.01) |

(52) U.S. Cl.

CPC ............ *G06F 3/0484* (2013.01); *G10L 15/26* (2013.01)

(58) Field of Classification Search

CPC .. G08B 13/19621; H04N 7/185; G06F 3/0484

See application file for complete search history.

(56) References Cited

U.S. PATENT DOCUMENTS

| | | | | |
|---|---|---|---|---|
| 6,535,639 | B1 * | 3/2003 | Uchihachi | G06F 16/7847 382/209 |
| 8,818,175 | B2 * | 8/2014 | Dubin | H04N 9/87 386/282 |
| 10,242,544 | B1 * | 3/2019 | Walters | G08B 13/19613 |
| 10,771,867 | B1 * | 9/2020 | Chemolosov | G06F 16/7837 |
| 2003/0131362 | A1 * | 7/2003 | Jasinschi | G06F 16/7834 725/87 |

(Continued)

OTHER PUBLICATIONS

Chaisorn et al., Video Retrieval—Evolution of Video Segmentation, Indexing and Search, 2009, IEEE, 5 pages. (Year: 2009).*

(Continued)

*Primary Examiner* — Linh K Pham

(74) *Attorney, Agent, or Firm* — Christopher R. Christenson; Kelly, Holt & Christenson, P.L.L.C.

(57) ABSTRACT

An automatic incident compilation system includes a media facilitator configured to receive a plurality of media files related to an incident. An application server is communicatively coupled to the media facilitator and includes a processor and memory containing instructions that, when executed, cause the processor to provide a storyboard application to a user. The storyboard application includes a storyboard creation user interface that is configured to allow a user to generate a user-customized display of the incident based on the plurality of media files. The processor is also configured to cause the storyboard application to change time information of one of the plurality of media files based on time information of another of the plurality of media files.

14 Claims, 21 Drawing Sheets

(56) References Cited

U.S. PATENT DOCUMENTS

| | | | | |
|---|---|---|---|---|
| 2005/0028194 | A1* | 2/2005 | Elenbaas | G06F 16/735 725/132 |
| 2006/0284978 | A1* | 12/2006 | Girgensohn | G06F 16/786 348/E7.086 |
| 2006/0288288 | A1* | 12/2006 | Girgensohn | G08B 13/19682 715/723 |
| 2008/0193101 | A1* | 8/2008 | Agnihotri | G11B 27/28 386/290 |
| 2009/0195651 | A1* | 8/2009 | Leonard | B60R 1/27 348/148 |
| 2010/0245584 | A1* | 9/2010 | Minasyan | G08B 13/1968 348/E7.085 |
| 2011/0107369 | A1* | 5/2011 | O'Brien | G06F 16/435 725/38 |
| 2011/0194839 | A1* | 8/2011 | Gebert | G11B 27/034 386/E5.028 |
| 2012/0254761 | A1* | 10/2012 | DeWitt | G11B 27/034 715/733 |
| 2013/0039634 | A1* | 2/2013 | M | G08B 13/19682 386/230 |
| 2014/0173437 | A1* | 6/2014 | Pugh | G11B 27/034 715/723 |
| 2014/0222995 | A1* | 8/2014 | Razden | G09B 7/02 709/224 |
| 2015/0202529 | A1* | 7/2015 | Paradise | A63F 13/352 463/31 |
| 2017/0046230 | A1* | 2/2017 | Guzik | H04L 65/765 |
| 2018/0059660 | A1* | 3/2018 | Heatzig | G06V 20/10 |
| 2018/0100748 | A1* | 4/2018 | Waniguchi | H04L 67/52 |
| 2018/0101970 | A1* | 4/2018 | Waniguchi | G06T 11/26 |
| 2019/0051046 | A1* | 2/2019 | Jin | G08G 5/26 |
| 2020/0092495 | A1* | 3/2020 | Siau | H04N 23/90 |
| 2020/0234611 | A1* | 7/2020 | Voorhees | G09B 7/06 |
| 2020/0309541 | A1* | 10/2020 | Lavy | G06V 20/588 |
| 2022/0076026 | A1* | 3/2022 | Walker | G06V 40/161 |
| 2022/0150554 | A1* | 5/2022 | Fiorentino | H04N 21/2343 |
| 2022/0239987 | A1* | 7/2022 | Gauglitz | H04N 21/2743 |
| 2023/0010320 | A1* | 1/2023 | Guzik | H04L 65/612 |
| 2023/0093416 | A1* | 3/2023 | Kumar | H04N 5/45 725/18 |
| 2023/0117085 | A1* | 4/2023 | Liu | H04N 21/44213 386/290 |
| 2024/0314406 | A1* | 9/2024 | Meier | G06N 20/00 |

OTHER PUBLICATIONS

Maybury et al., Multimedia Summaries of Broadcast News, 1997, IEEE, 8 pages (Year: 1997).*

Tang et al., NewsEye: a News Video Browsing and Retrieval System, 2001, IEEE, 4 pages (Year: 2001).*

* cited by examiner

AUTOMATIC INCIDENT COMPILATION SYSTEM

CROSS-REFERENCE TO RELATED APPLICATION

The present application is based on and claims the benefit of U.S. Provisional Patent Application Ser. No. 63/336,937, filed Apr. 29, 2022, the content of which is hereby incorporated by reference in its entirety.

BACKGROUND

Police officers, firemen, security personnel, and other emergency responders are the often the first to respond to various incidents. Their response time is typically measured in minutes and the incident can often be an emergency life or death situation ranging from a traffic accident to confronting an active shooter. During such situations, events may unfold very quickly and it is sometimes difficult to know what happened and when it happened.

With the advent of modern camera technology, emergency personnel often carry body cameras that record the events of an incident. Additionally, many people now carry cellular telephones that are equipped with high-quality cameras. Further, more and more vehicles, including substantially all police cars, are equipped with dash cameras. Adding to that, many of us have cameras on our houses (e.g., doorbell cameras or security cameras) as well as our places of business. Thus, cameras pervade modern life. However, the large number of cameras that may contain information relevant to a particular incident adds significant complexity to the manipulation and storage of such data. Additionally, a particular view of an incident may need to vary based on who is watching it. For example, a view that is suitable for public, including children, may differ significantly from a view that is suitable for a prosecuting attorney or a jury.

Another challenge for compiling incidents is the precise timing of words and/or actions may be very important to a clear understanding of what exactly happened. When different cameras have different base times (i.e., one camera is one minute ahead of the other camera) it can be difficult to know the true chronology of event. Providing a system and method that not only effectively allows ease of interaction with various media files, but also facilitates resolving time differences or provides time normalization will improve general understanding of the recorded incidents.

SUMMARY

An automatic incident compilation system includes a media facilitator configured to receive a plurality of media files related to an incident. An application server is communicatively coupled to the media facilitator and includes a processor and memory containing instructions that, when executed, cause the processor to provide a storyboard application to a user. The storyboard application includes a storyboard creation user interface that is configured to allow a user to generate a user-customized display of the incident based on the plurality of media files. The processor is also configured to cause the storyboard application to change time information of one of the plurality of media files based on time information of another of the plurality of media files.

DETAILED DESCRIPTION OF ILLUSTRATIVE EMBODIMENTS

Embodiments described below generally help interested entities, leaders, prosecutors, jurors, et cetera, better understand an incident. The dissemination of information to public defenders and others in need of information related to an incident is also improved. Further, the ability to visualize an incident using spacio-temporal methods and the ability to transcribe and search through video and audio artifacts is also provided. Additionally, discrepancies between various media and written reports are reduced or even eliminated.

Embodiments described below generally provide the ability to utilize individual pieces of media from various sources and in various formats while still maintaining the full media intact. Further, embodiments allow a user to show an audience key parts of a particular incident in a very quick and efficient manner that can easily be replicated. Further still, embodiments also provide the ability to relate or otherwise associate narrative comments to key places on a timeline to easily navigate to those areas through a myriad of media. Additionally, in some embodiments, all media is transcribed, either automatically or manually, in order to provide keyword search functionality over all media associated with a particular incident. Additionally, a user can specify one or more keywords and receive a notification (such as an email) from the system if any transcription associated with a particular incident has the specified word(s) and/or phrases.

Figure 1:
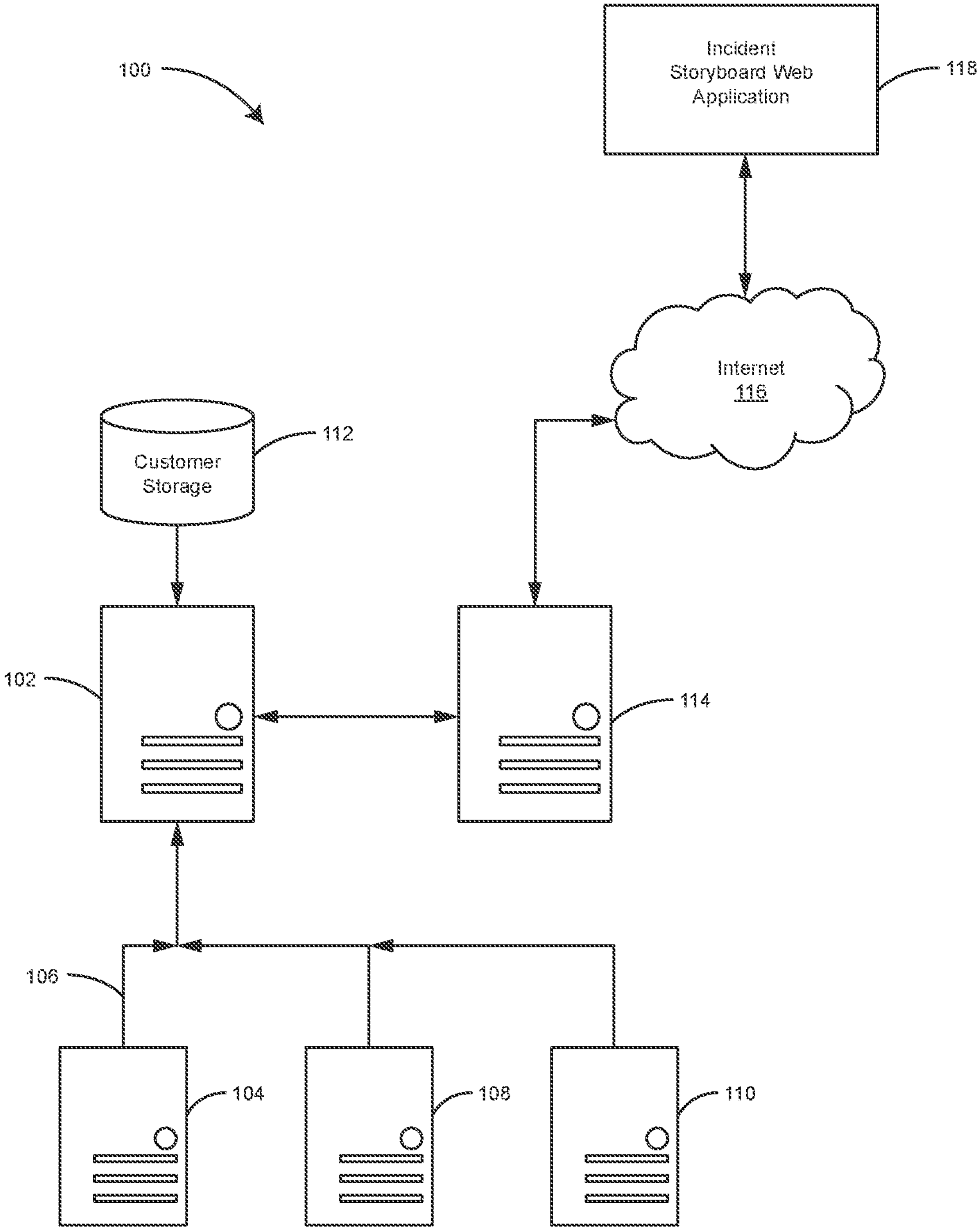
FIG. 1 is an architectural view of one particular architecture in which embodiments described below may be practiced.

FIG. 1 is an architectural view of one particular architecture in which embodiments described below may be practiced. Architecture 100 includes streaming server/media facilitator 102. While indicated as a single device, streaming server/media facilitator 102 may comprise any suitable number of computer devices. Streaming server/media facilitator 102 is communicative coupled to squad media 104 via communication link 106. Squad media 104 can include any suitable media sources provided by police dash cameras or other cameras positioned on a police vehicle. Communication link 106 may be a network connection or a local databus such as a USB link. As shown in FIG. 1, communication link 106 may also communicatively couple bodycam video source 108 to streaming server/media facilitator 102. Bodycam video source 108 may be a computing device configured to interface with one or more police body cameras in order to receive stored video(s) from the body cameras. Communication link 106 may also coupled streaming server/media facilitator 102 to other sources of media, as indicated at reference numeral 110. These additional sources of media may include other video sources, such as cellular telephone cameras, security cameras, traffic cameras, doorbell cameras, helicopter cameras, et cetera. Additionally, media sources other than video may also be received, such as audio sources like phone calls (e.g., 911 calls), recordings from police radios or scanners, audio from gunshot detection devices (e.g., Shot Spotter Gunshot Detection available from Shot Spotter, Inc.), et cetera.

Streaming server/media facilitator 102 is coupled to or includes customer storage 112. Storage 112 is configured to store the various media files. Storage 112 may include one or more hard drives, optical disks, hard drive cartridge assemblies, tape storage devices, storage servers or any combination thereof.

Streaming server/media facilitator 102 is communicatively coupled to application server 114. Application server 114 receives one or more video/audio files, or portions thereof, from streaming server/media facilitator 102 and provides such files/portions in an application that is presented to a user. As shown in FIG. 1, application server 114 is preferably coupled to a wide area network, such as the internet 116, so that the application can be presented to a user at a remote location. Thus, a computer executing client software, such as a web browser, may engage with application server 114 to provide the functions of an incident storyboard web application 118.

Figure 2:
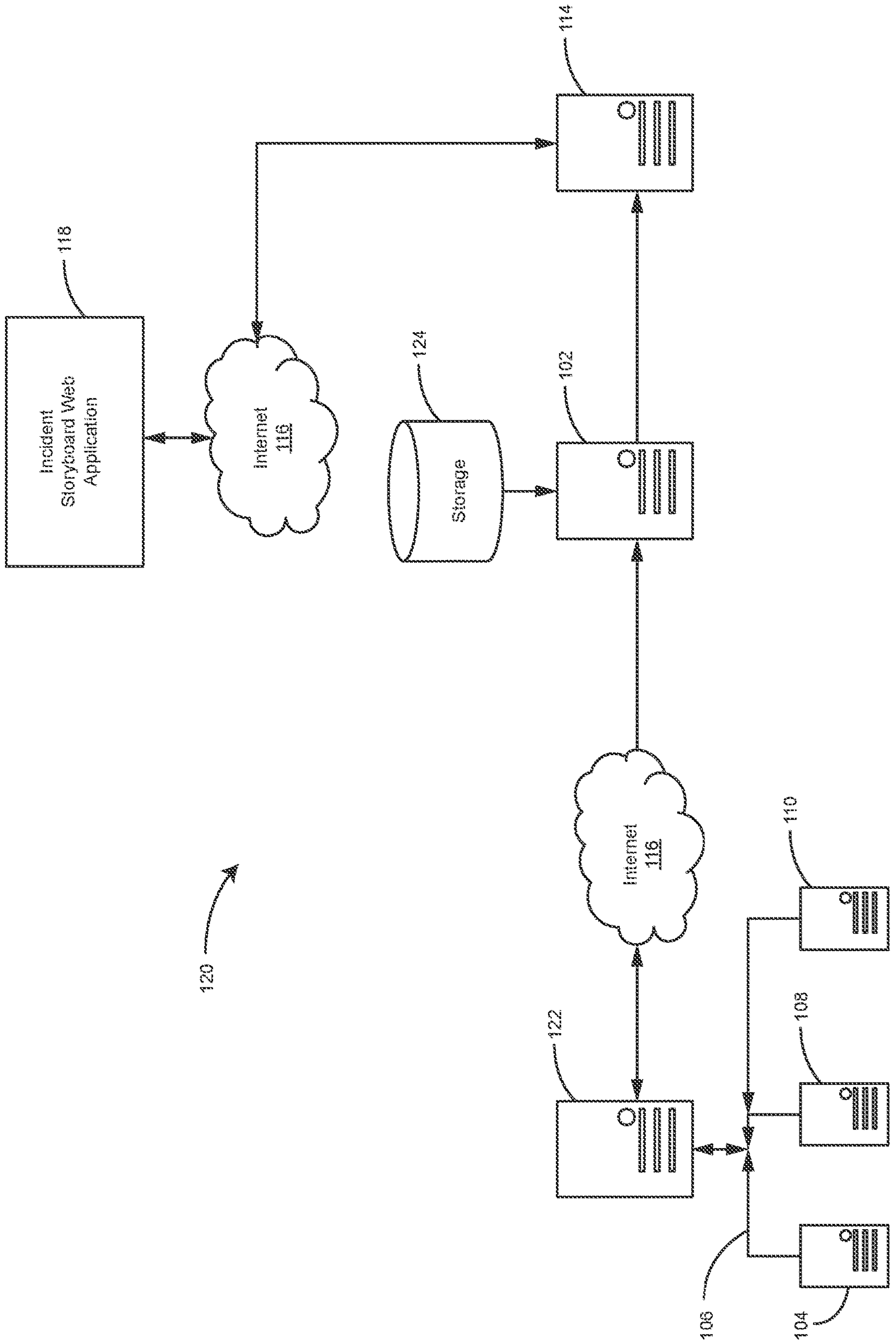
FIG. 2 is an architectural view of another architecture in which embodiments described below may be practiced.

FIG. 2 is an architectural view of another architecture in which embodiments described below may be practiced. Architecture 120 bears some similarities to architecture 100 and like components are numbered similarly. As can be seen in FIG. 2, architecture 120 has streaming server/media facilitator 102 located remote from the "customer environment." Instead, a media transfer server 122 is located at the in the customer environment (i.e., on-premise) and communicates with streaming server/media facilitator 102 via a data connection using a wide area network, such as internet 116. Additionally, storage 124 is located away from the customer environment as well. Storage 124 may include one or more hard drives, optical disks, hard drive cartridge assemblies, tape storage devices, storage servers or any combination thereof. Additionally, any or all of storage 124, streaming server/media facilitator 102, and application server 114 can be cloud computing elements. A cloud computing example of storage 124 is cloud storage provided by a cloud storage provider such as Amazon, Google, or Microsoft. An example of a cloud database that can be employed in various embodiments described herein is Amazon RDS or MySql. A cloud computing example of a computational resource that can support streaming server/media facilitator 102 and/or application server is an Amazon EC2 resource. Those skilled in the art will recognize that various other resources and providers can be employed for cloud-based implementations.

Cloud computing provides computation, software, data access and storage services that do not require end user knowledge of the physical location or configuration of the system that delivers the services. In various embodiments, cloud computing delivers the services over a wide area network, such as the Internet, using appropriate protocols. For instance, cloud computing providers deliver applications over a wide area network such that they can be accessed through a web browser or other computing component. Software or components of the system as well as the corresponding data can be stored on servers at remote location. The computing resources in cloud computing environments can be consolidated at remote data center locations or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways. Cloud computing provides an important feature for the system described herein; scalability. A cloud computing embodiment can provision one or more cloud resource machines as needed.

Figure 3:
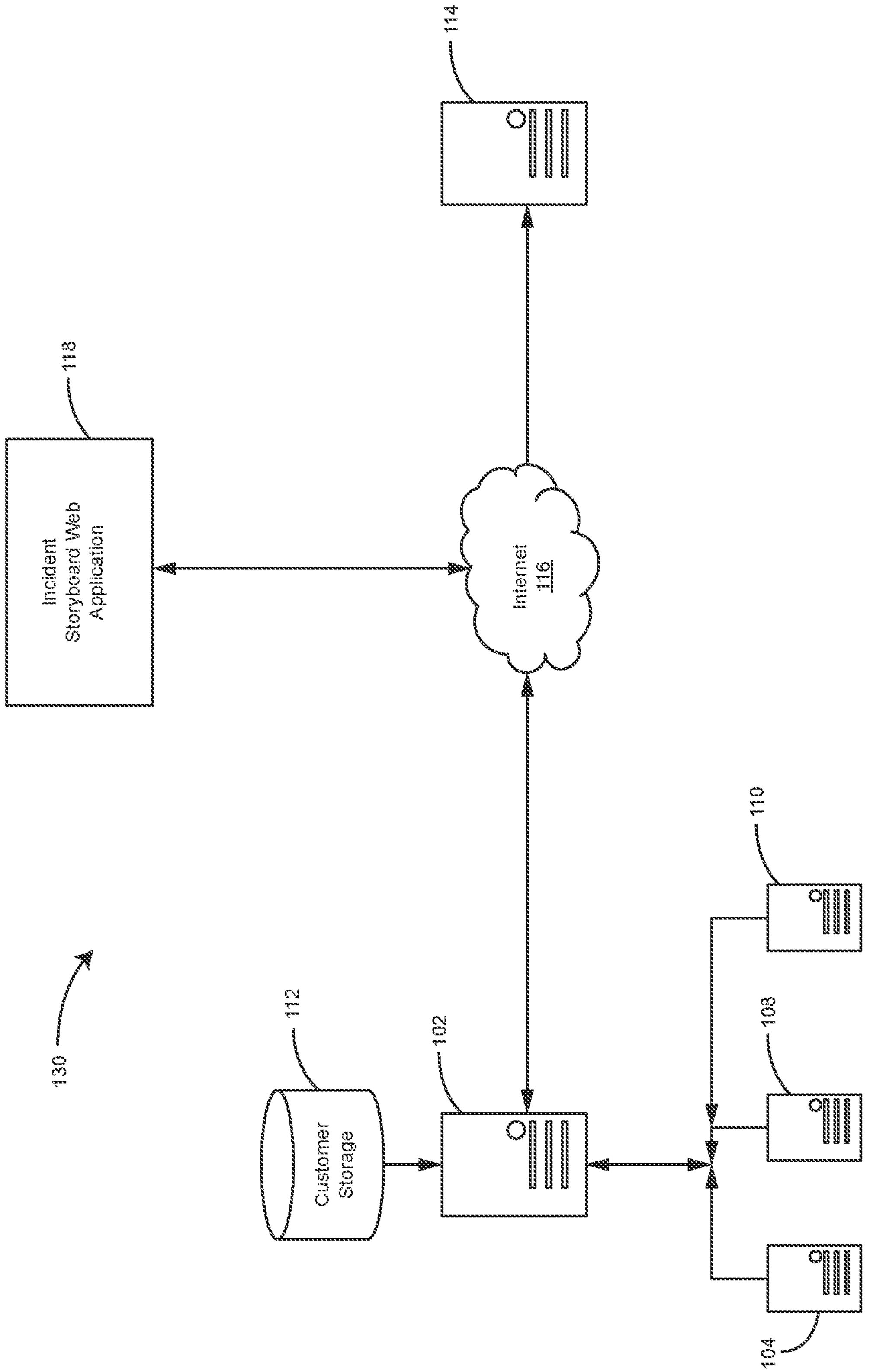
FIG. 3 is an architectural view of still another architecture in which embodiments described below may be practiced.

FIG. 3 is an architectural view of still another architecture in which embodiments described below may be practiced. Architecture 130 bears some similarities to architectures 100 and 120 and like components are numbered similarly. Architecture 130 is a hybrid architecture in that it includes a number of resources in the customer environment (such as streaming server/media facilitator 102 and storage 112) as well as at least one cloud resource (FIG. 3 shows application server 114 located away from the customer environment and accessible through internet 116). Accordingly, considering FIGS. 1-3, embodiments described herein are practicable using a local installation (i.e., at a customer environment), using a cloud implementation, or a hybrid version of the two.

Figure 4:
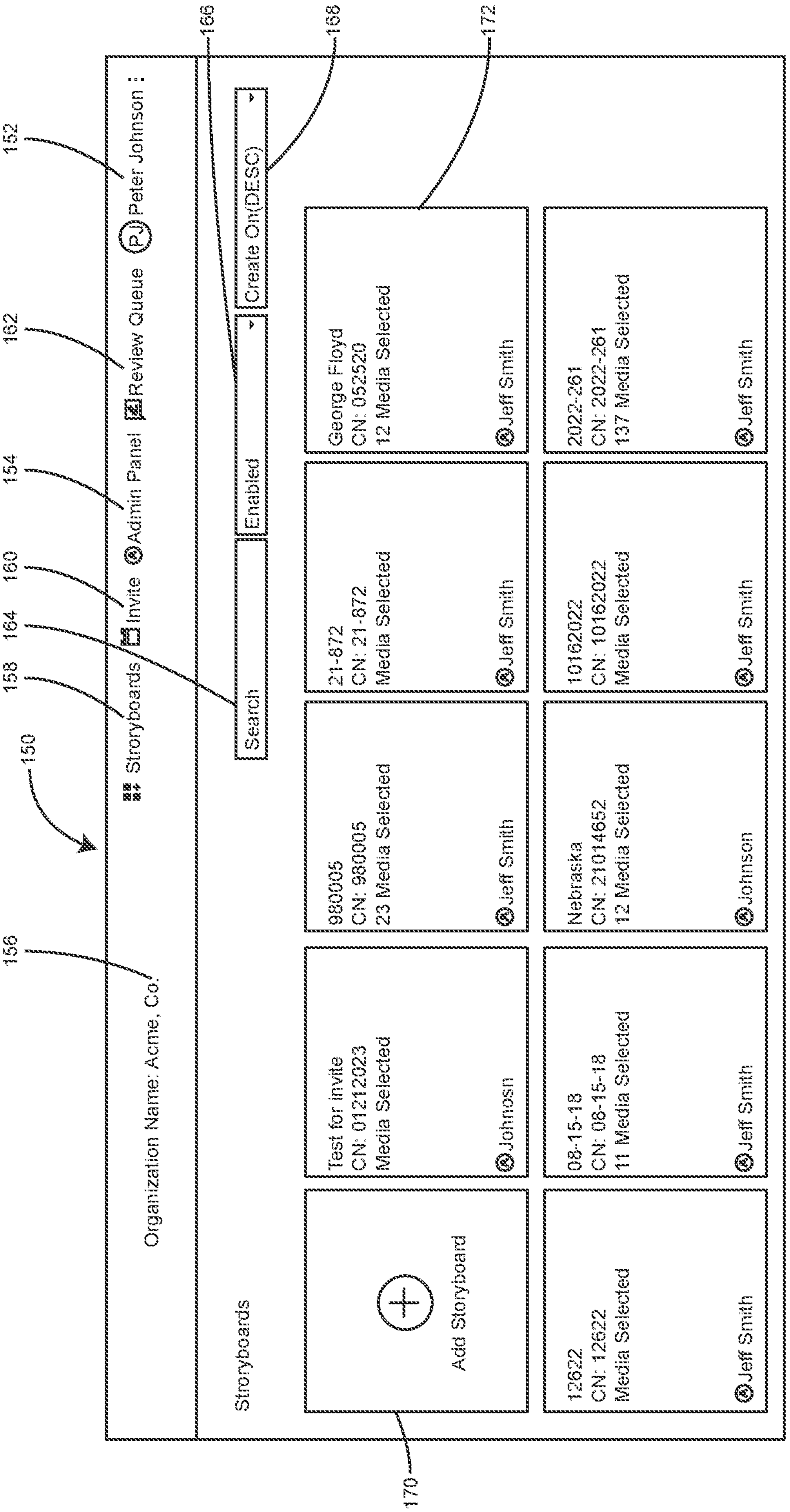
FIG. 4 is a diagrammatic screenshot of a main screen that is displayed to a user of an incident storyboard web application when the user has successful authenticated to the system.

FIG. 4 is a diagrammatic screenshot of a main screen that is displayed to a user of an incident storyboard web application when the user has successfully authenticated to the system. In the illustrated example, the user is Peter Johnson as indicated in the upper right-hand corner 152 of main screen 150. If the user has administrative rights, such as in the example shown in FIG. 4, an admin panel user interface element 154 will display allowing the user to change administrative options and features for the application. Main screen 150 also includes an organization name indicator 156 illustrating the name of the organization for which the application is running. In the illustrated example, the organization is ACME, Co. As indicated, there are tabs 158, 160, and 162 available to the user for interacting with storyboards, inviting other users, or reviewing queues, respectively. Additionally, a search box 164 is provided that allows the user to enter keywords or text that can be used to search for a particular storyboard having the search text as a title, or other associated metadata, for example. As shown, the search functionality can be enabled or disabled as desired, via status field 166. Additionally, storyboards can be sorted in any particular order based upon the setting in sorting order window 168. In the illustrated example, nine different storyboards are shown as well as a user interface element 170 that, upon actuation, will allow the user to add a storyboard to the storyboards managed by the application for the organization. Preferably, each individual storyboard includes a title shown at the top of each storyboard tile. Additionally, a unique case number (CN) is also used to identify the storyboards. The case number may refer to an internal police department file system, a court docket number or any other suitable indicator. Additionally, as shown in FIG. 4, each tile preferably indicates the number of media files associated with the particular storyboard and may break the media type down by image, video, and audio. Finally, at the bottom of each storyboard tile, the owner or author of the storyboard is provided as well as the time of creation for the storyboard. When a user selects an individual storyboard tile, such as George Floyd storyboard 172, the display will transition to a storyboard display.

Figure 5:
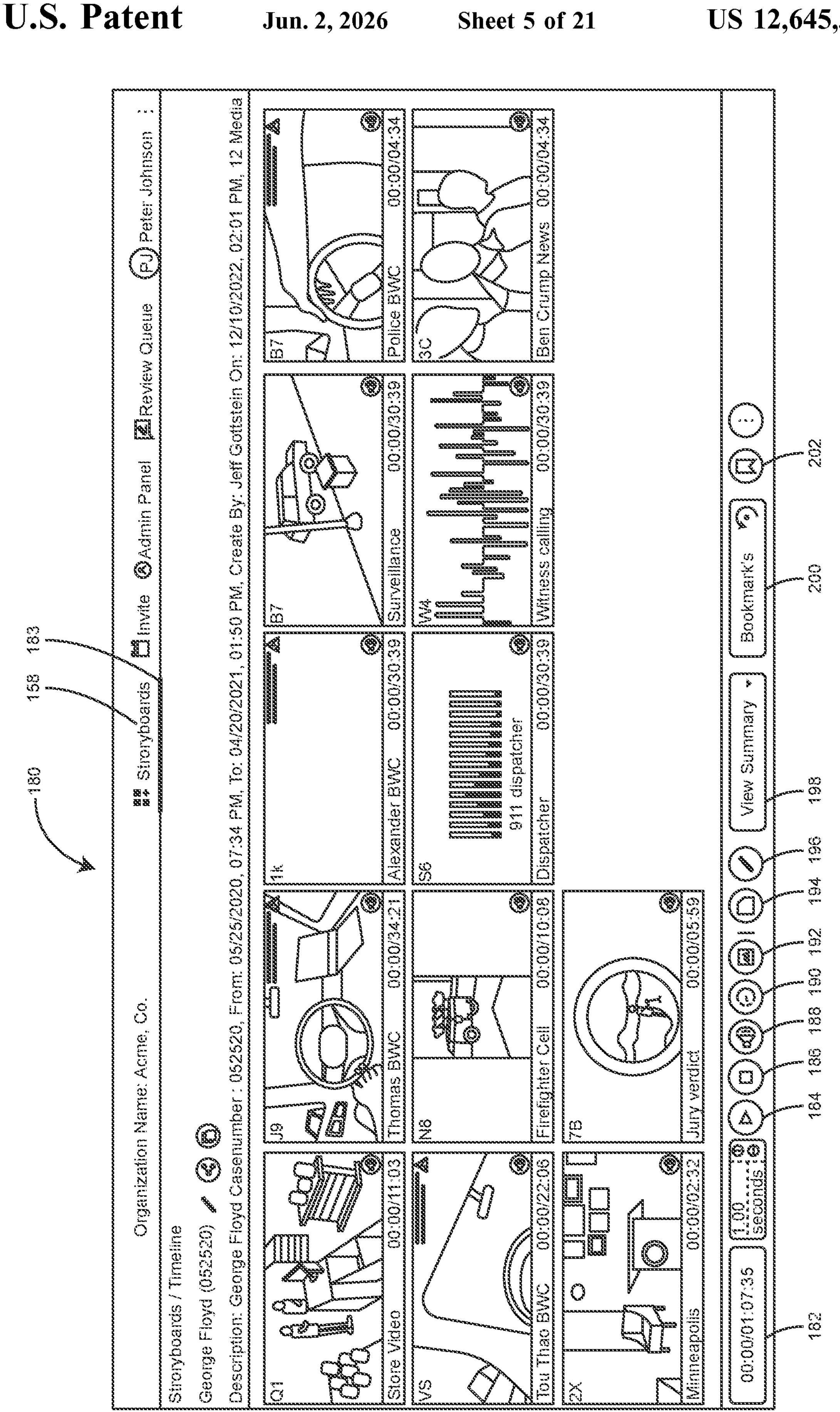
FIG. 5 is a diagrammatic screenshot of a storyboard display that appears to a user when a storyboard tile is selected.

FIG. 5 is a diagrammatic screenshot of a storyboard display that appears to a user when a storyboard tile, such as storyboard tile 172 (shown in FIG. 4), is selected. When the storyboard display is shown, users are able to load all needed digital files (audio, video, or images) of a variety of different file types into the system. As can be appreciated, as media files have larger and larger sizes (for example, 1 minute of a 4 k/60 fps video files may be as large as 750 megabytes) it can become difficult for a software system to manipulate entire files. In accordance with one embodiment, at least some of the media files uploaded into the system (such as video files) are chopped or otherwise broken into a series of smaller files with pointers or some other suitable data structure associated therewith that allows the series of files to be accessed in order to allow the user to play, modify, or otherwise change, the entire video file. However, since the media file is broken into smaller pieces, when the user interacts with the media file (entire media file from the user's perspective) the user may be only interacting with one or more of the file portions. This allows the system to interact with a significant number of media files without overly taxing hardware resources.

Referring to FIG. 5, the user can select the most appropriate media files to be included in the base storyboard. In the illustrated example, there are 12 files that have been selected for the storyboard. The total time of the incident is 01:07:15 as noted in the lower left-hand corner in time window 182. Additionally, in the storyboard display mode, an indicator 183 is shown below storyboards tab 158 indicating to the user that the user is currently viewing a storyboard. In the base storyboard view shown in FIG. 5, the user may play the storyboard summary by pressing play button 184, or may stop the playback by pressing stop button 186. Additionally, audio may be adjusted by interacting with a speaker button 188. In one example, button 188 is used to simply mute the entire timeline audio. If the user interacts with button 190, the speed of the playback may be slowed down or increased, as desired. Button 192, when selected, will hide non-playing video. When so engaged, only playing videos will be shown. If the user selects button 194, the user will be directed to a display that will allow the user to create a summary. Selecting button 196, will allow the user to edit or delete an existing summary. Selecting field 198 allows the user to play an existing summary, while selecting field 200 allows the user to play, edit or delete existing bookmarks. Similarly, engaging element 202 allows the user to create a bookmark to mark a specific spot on the storyboard timeline.

As set forth above, the system will preferably sequentially load the media files and/or file portions using metadata and using spatial temporal techniques to automatically create a storyboard of the incident starting at the beginning and playing the corresponding files as they progress through the incident. The user can scroll down and see the actual timeline and which videos are playing when. When the user presses play, the incident will play out from multiple viewpoints based on the actual timing of the incident. When this occurs, the display will transition to that shown in FIG. 6.

Figure 6:
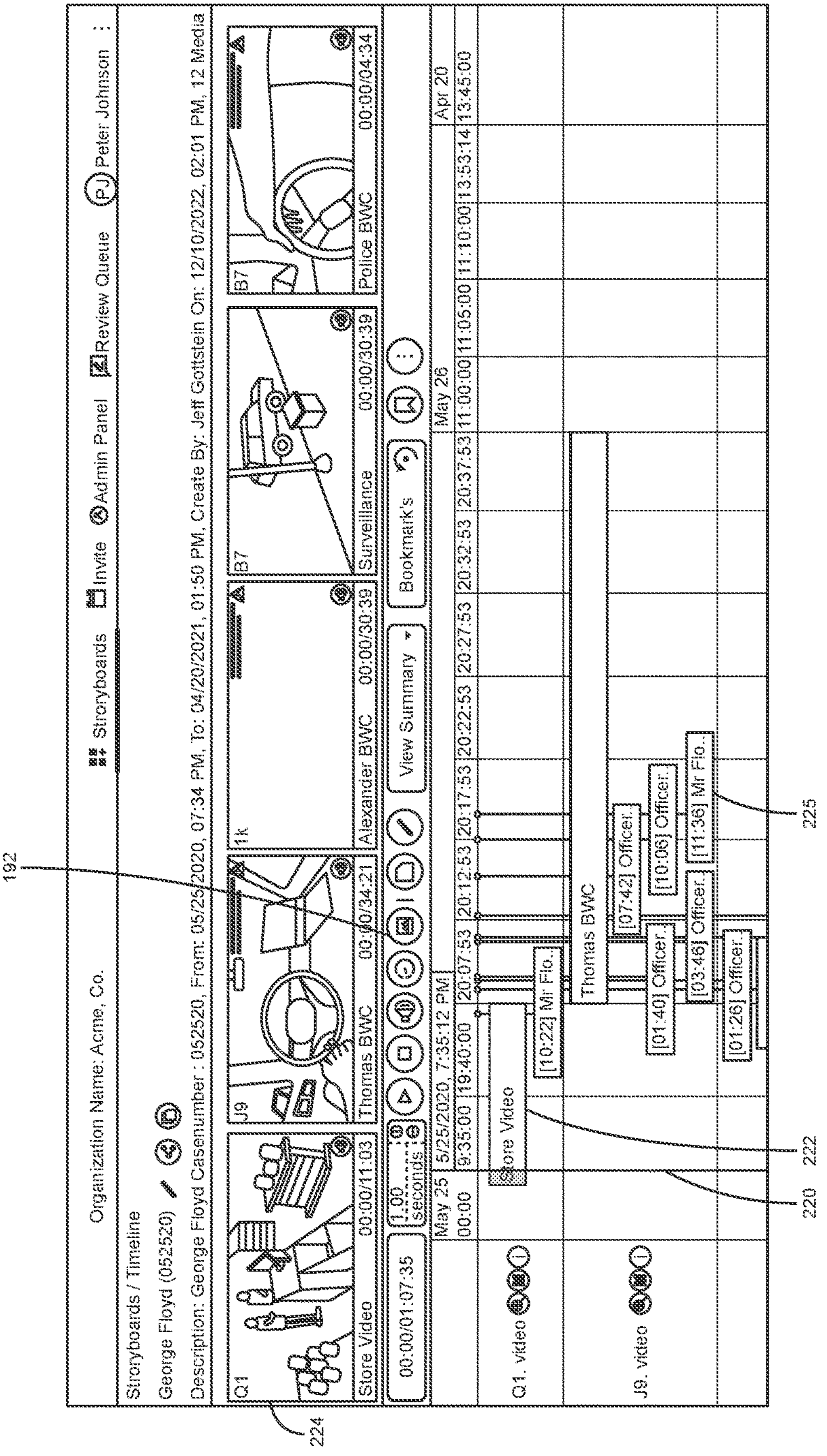
FIG. 6 is a diagrammatic screenshot of a storyboard being played in accordance with one embodiment.

FIG. 6 is a diagrammatic screenshot of a storyboard being played in accordance with one embodiment. As shown in FIG. 6, while the storyboard is being played, an indicator, preferably in the form of a vertical line 220 shows where the user is within the timeline. In the illustrated example, the user's position on the timeline is shown and the timeline has a total playtime of 1 hour, 7 minutes and 35 seconds. The only video that exists for this particular time, is indicated at rectangle 222 labeled "store video", and video tile 224. The user can also see various comments that have been added (shaded boxes such as box 225) that correspond with what is happening in the timeline at that particular time. As set forth above, one of the features of embodiments described herein is the ability to hide videos that are not currently playing. Thus, if the user selects button 192, all non-playing videos will be hidden.

Figure 7:
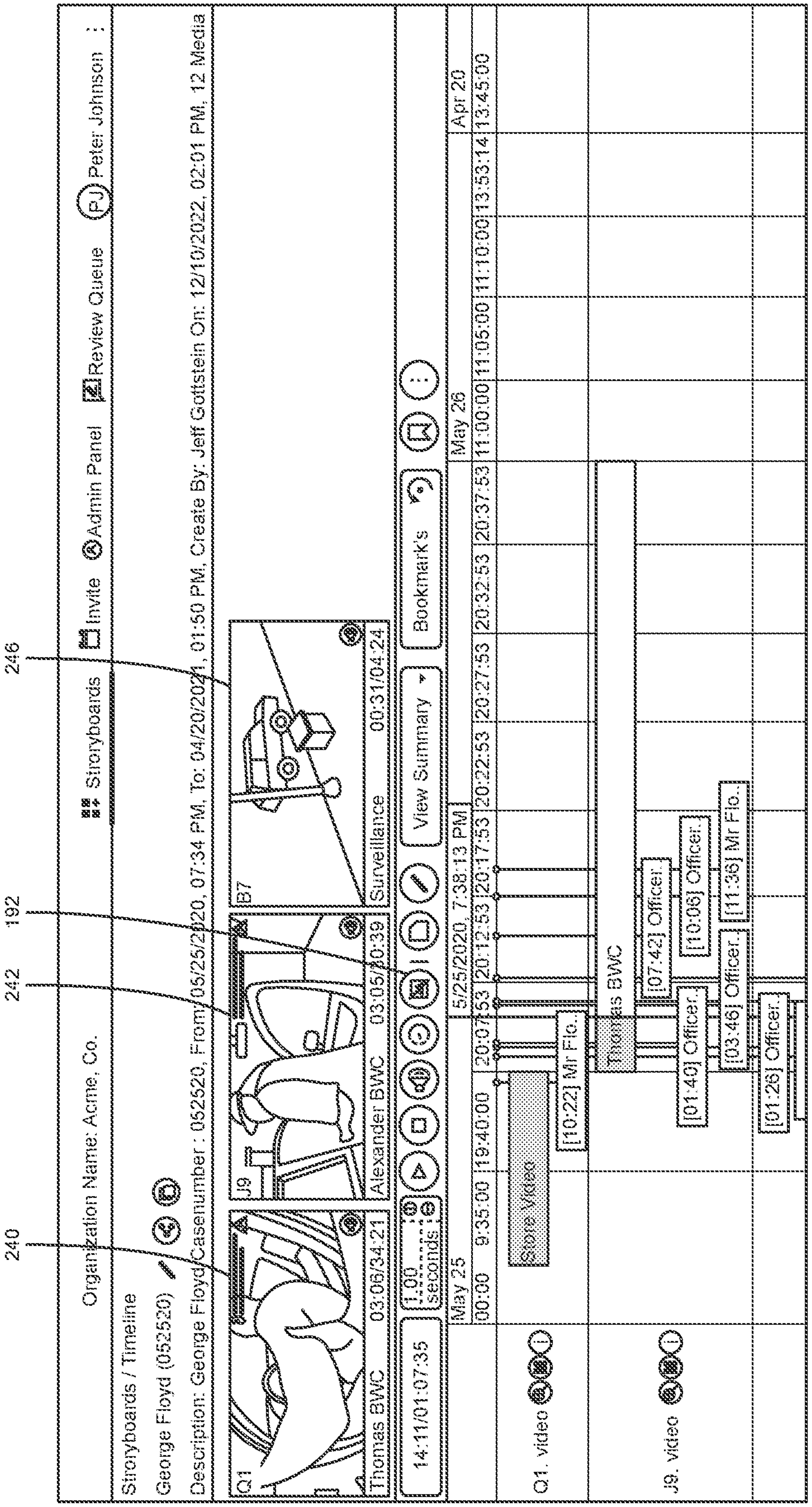
FIG. 7 is a diagrammatic screen shot of a storyboard being played where non-playing videos have been hidden.

FIG. 7 is a diagrammatic screenshot of a storyboard being played where non-playing videos have been hidden. As shown in FIG. 7, button 192 has been modified to show a slash indicating that non-playing videos are currently hidden. Additionally, the timeline has moved forward in FIG. 7 compared to that of FIG. 6 (14:11/01:07:35). In the illustrated example, three videos are currently playing, a body-worn camera illustrated at video box 240, a second body-worn camera 242, and a surveillance video 246. The selective display of multiple different videos all synchronized to the same time of the incident provides an important configurable perspective for understanding what is happening when in a particular incident. This can provide tremendous insights into the various intricacies of a particular incident.

Figure 8:
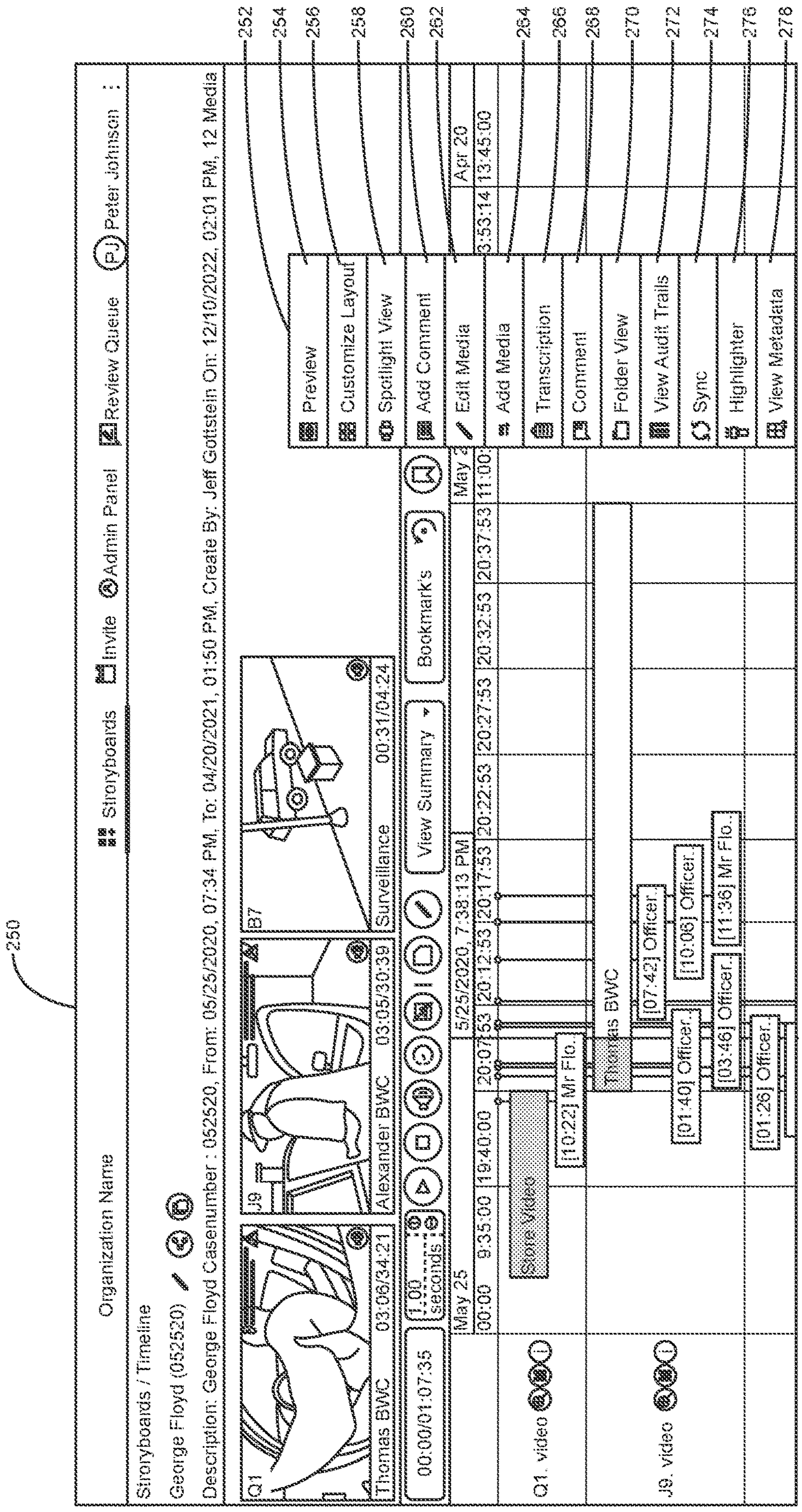
FIG. 8 is a diagrammatic screenshot of storyboard playback illustrating various options/functions that available to the user when in the storyboard view.

FIG. 8 is a diagrammatic screenshot of storyboard playback illustrating various options/functions available to the user when in the storyboard view. Screenshot 250 shows an option/function pane 252 that becomes available when a user clicks on three dots in the storyboard application, while a storyboard is playing, or otherwise selects options/functions. In the illustrated example, functions include a preview function 254, layout customization 256, a spotlight view 258, the ability to add a comment to the storyboard by selecting user interface element 260, the ability to edit or add media by selecting user interface elements 262, 264, respectively, as well as others. Additionally, as shown, transcription can be engaged for the storyboard by selecting user interface element 266. Such transcription will preferably automatically transcribe words spoken or otherwise uttered during audio of any media file in the storyboard into text. This is particularly advantageous in that it allows for searching for particular words. Additionally, the transcription is preferably tied to the timeline such that the time a particular word is spoken is also stored or otherwise associated with the word. As shown in FIG. 8, an additional option includes the ability to simply comment on the storyboard as indicated at reference numeral 268. Further, a folder view can be selected by interacting with user interface element 270. Audit trails can be viewed by the user by interacting with user interface element 272. Embodiments described herein also provide the ability to simply play/export the entire storyboard as a single video file that can then be shared. The processing/exporting of the entire storyboard into the single video file can be done as a background process that occurs on-premise, in the cloud, or both.

Media can be synced to the timeline by selecting user interface element 274. The ability to synchronize the time of a particular media file to another media file is particularly useful when determining precise chronology of events/utterances. In one example, a time marker or position in a source media file can be matched to a user-selected time marker or position in a destination media file where the destination media file will have its time changes such that the destination time marker or position is identical to the time marker or position of the source media file. In another example, a doorbell camera may have a source time and a squad camera that can be seen driving by the doorbell camera at a particular instant can be synchronized to the time of the doorbell camera by using the instant when the squad passes the doorbell camera. Certainly, other types of time synchronization can be utilized in accordance with embodiments described herein. For example, the audio between two files can be matched such that the time of an occurrence of a particular word in one file can be correlated to the occurrence of the particular word in another file to synchronize time of one of the files to the other file. Additionally, metadata, such as date/time can be automatically extracted from on-screen data, such as is commonly provided on commercially available dash cameras or body cameras. This metadata can then be used to automatically place the media properly on the right spot of the timeline.

Referring to FIG. 8, option/function pane 252 also includes a highlighter function that can be used to highlight a particular element or time in the storyboard by selecting user interface element 276. Finally, the user may view metadata of the storyboard and/or any particular media files associated therewith by selecting user interface element 278. When the user selects option 256, the application will transition to a customized layout view.

Figure 9:
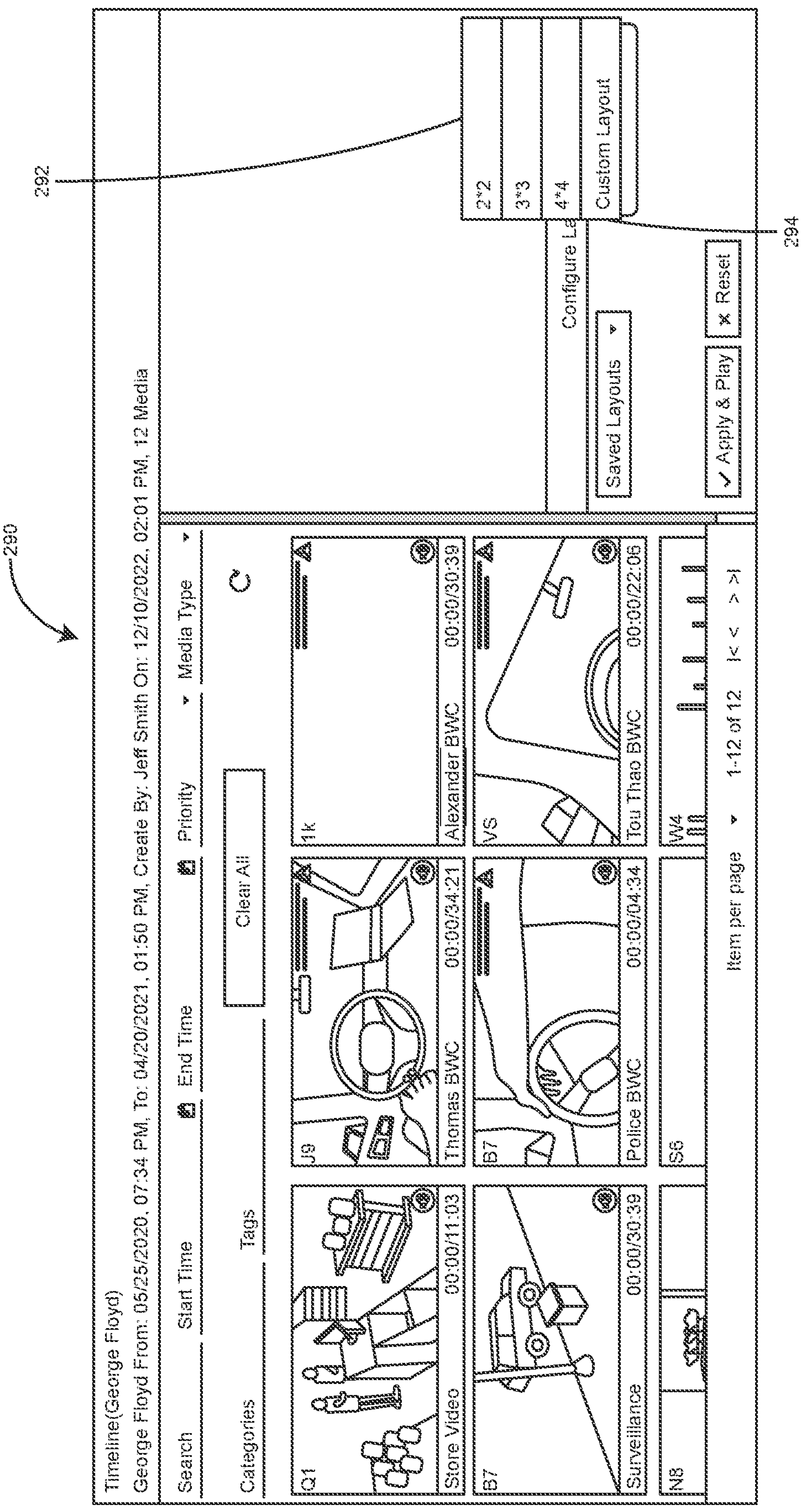
FIG. 9 is a diagrammatic screenshot of a layout customization function of a storyboard application in accordance with one embodiment.
Figure 10:
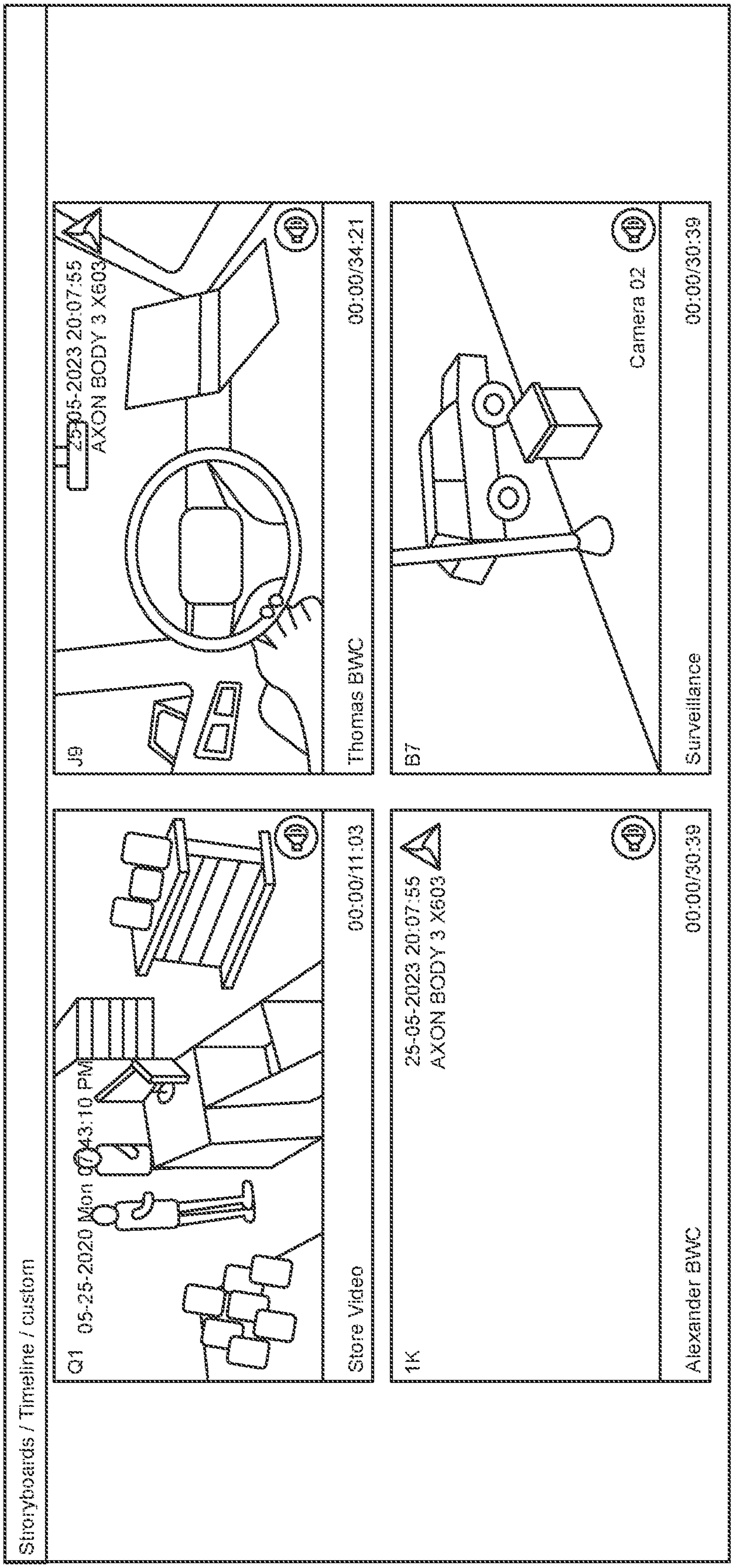
FIG. 10 is a diagrammatic screenshot of a storyboard timeline view using a 2 by 2 grid of media files.

FIG. 9 is a diagrammatic screenshot of a layout customization function of a storyboard application in accordance with one embodiment. Screenshot 290 shows all of the media files associated with the particular timeline, as well as option window 292 for selecting a particular layout. In the illustrated example, layouts can include a 2 by 2 layout, a 3 by 3 layout, a 4 by 4 layout, or a custom layout as indicated at reference numeral 294. In the example shown in FIG. 9, a 3 by 3 grid is shown. However, if the user select's a different value, such as 2 by 2, the storyboard timeline view will switch to that shown in FIG. 10 which is a 2 by 2 grid of the media files.

The system thus allows the user to create and play a summary of a particular instant. The summary is preferably a single video comprised of specified video clips from various video files to present the most important elements of an incident.

Figure 11:
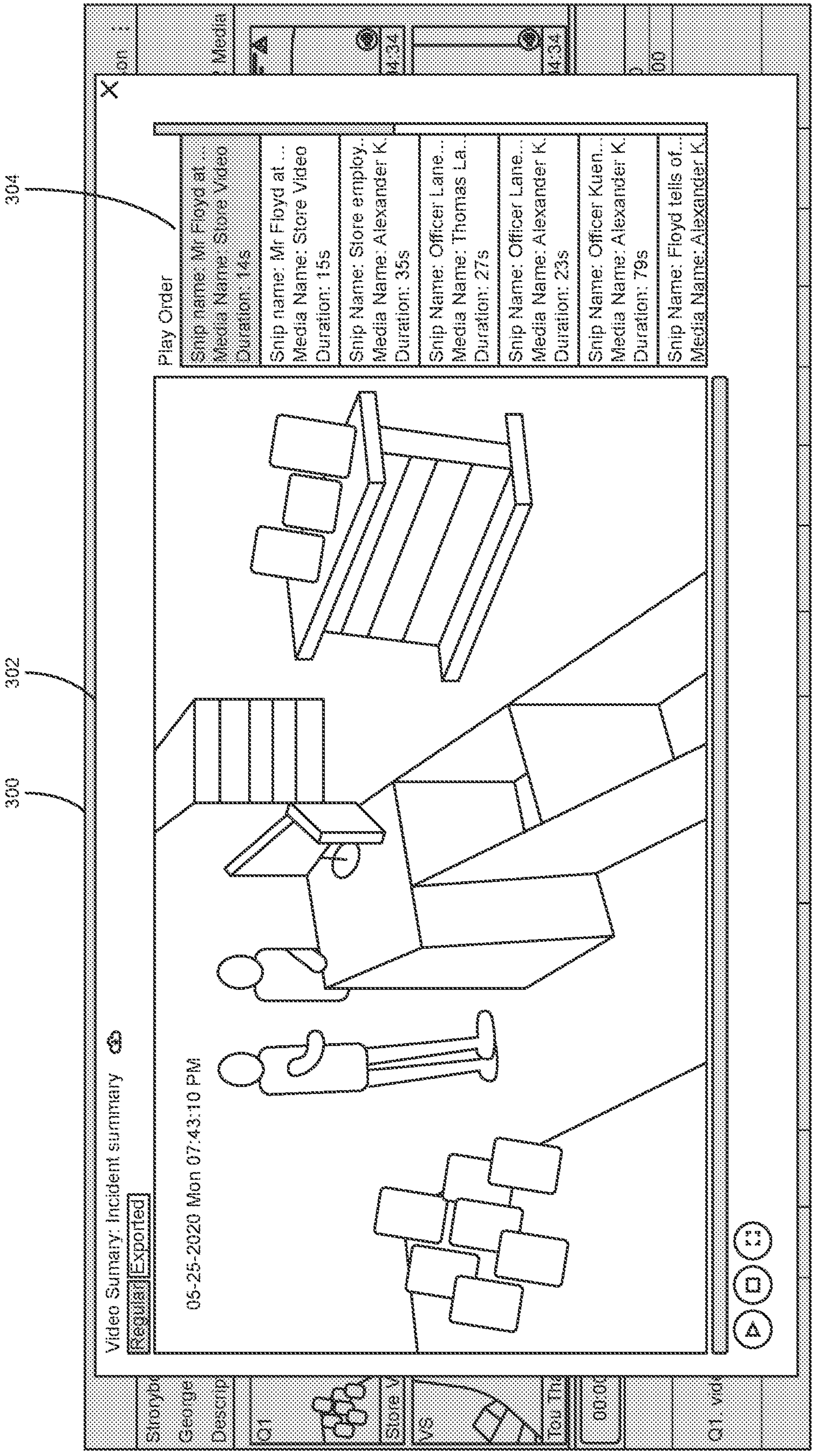
FIG. 11 is a diagrammatic screenshot of a summary comprised of selected media clips.

FIG. 11 is a diagrammatic screenshot of a summary comprised of user-selected media clips. Screenshot 300 includes a current video window 302 as well as a listing 304 of the various clips included in the summary. The list 304 displays the clips included in the summary, what videos the clips were taken from, and the duration of each of the clips. The user can preferably download the summary and use the summary as a presentation tool. One of the features of embodiments described herein is the ease with which various summaries can be created.

Figure 12:
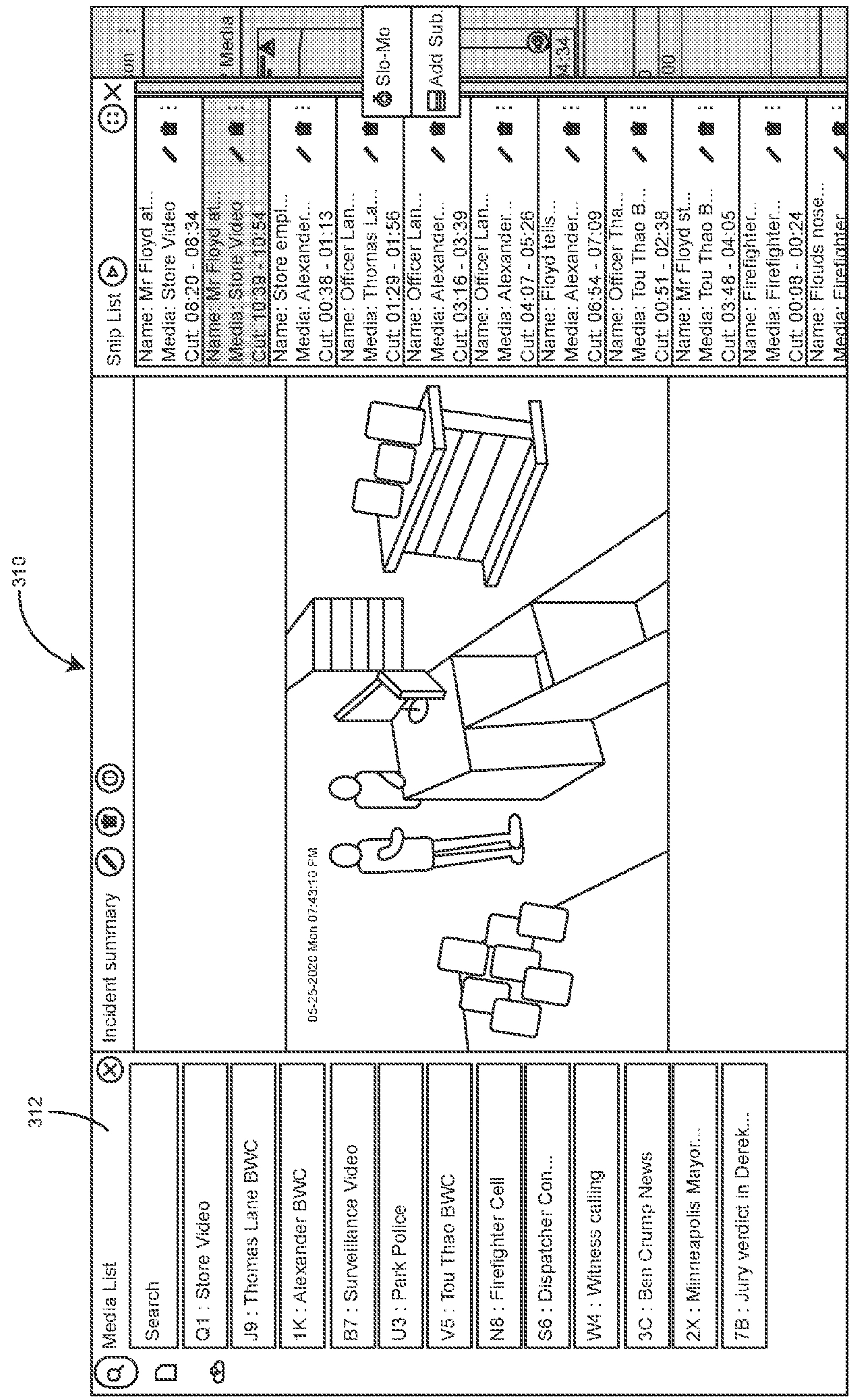
FIG. 12 is a diagrammatic view of a summary creation functionality screen of an instance storyboard application in accordance with one embodiment.

FIG. 12 is a diagrammatic view of a summary creation functionality screen of a storyboard application in accordance with one embodiment. Screen 310 includes a listing 312 of all files available to be used in the summary. The user may add a custom title screen to the summary, as desired. This title screen may provide context about the summary or any other suitable information relative to the summary or incident. When a user clicks on a particular file in the media list, the display transitions to that shown in FIG. 13.

Figure 13:
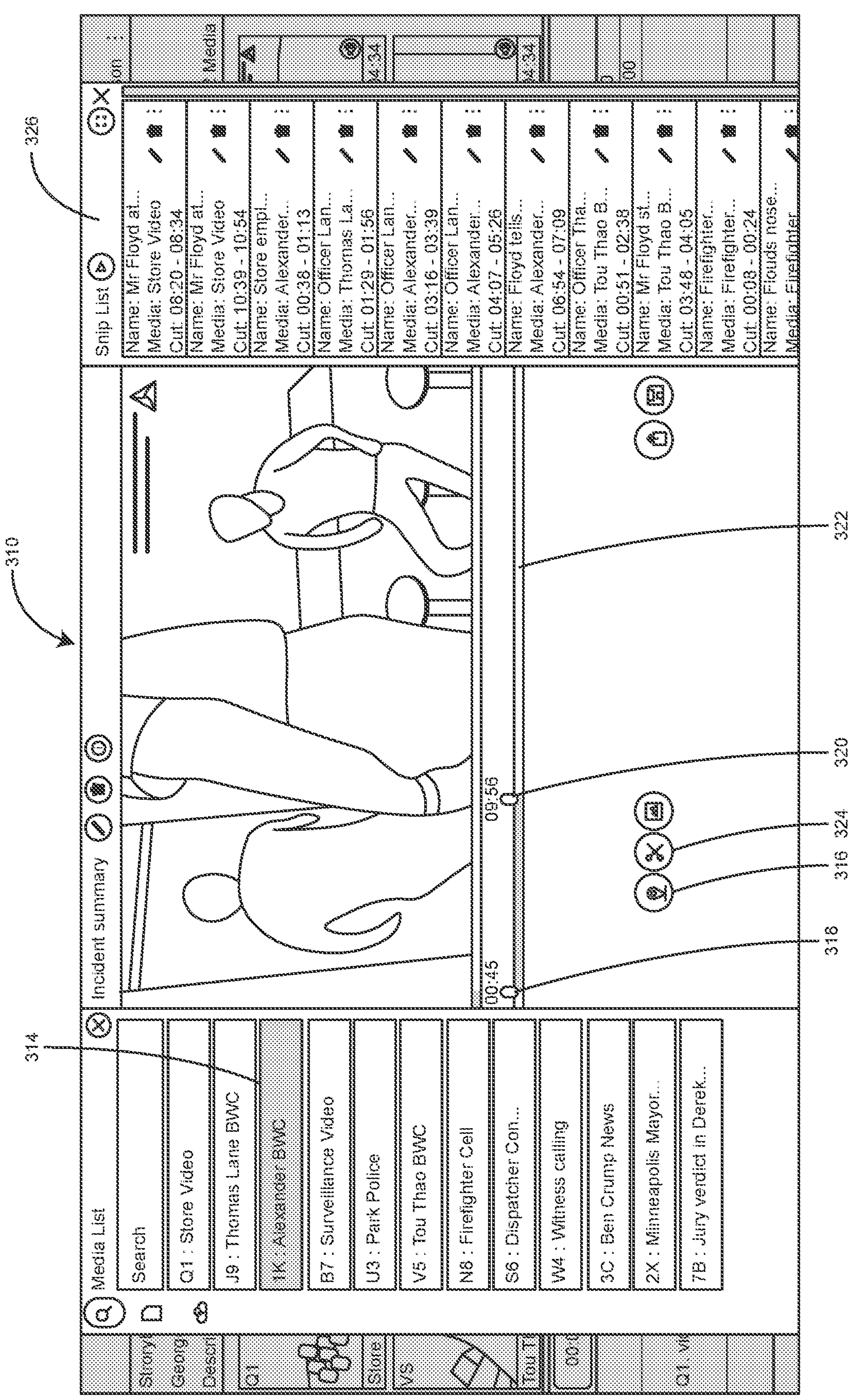
FIG. 13 is a diagrammatic screenshot of a user-selected video.

In FIG. 13, the user has selected video indicated at shaded box 314. To create a particular snip, the user marks the beginning of the snip by pressing button 316 and the goal posts 318 (start), 320 (end) on timeline 322. When the user clicks button 316 again, the other goal post 320 marks the end of the snip. The user presses the scissors button 324 and the snip can be named and then added to snip list 326. The user can also add titles to the files playing and determine the length of time that the title is displayed. The user can also play the summary in slow motion or play the summary frame by frame.

Figure 14:
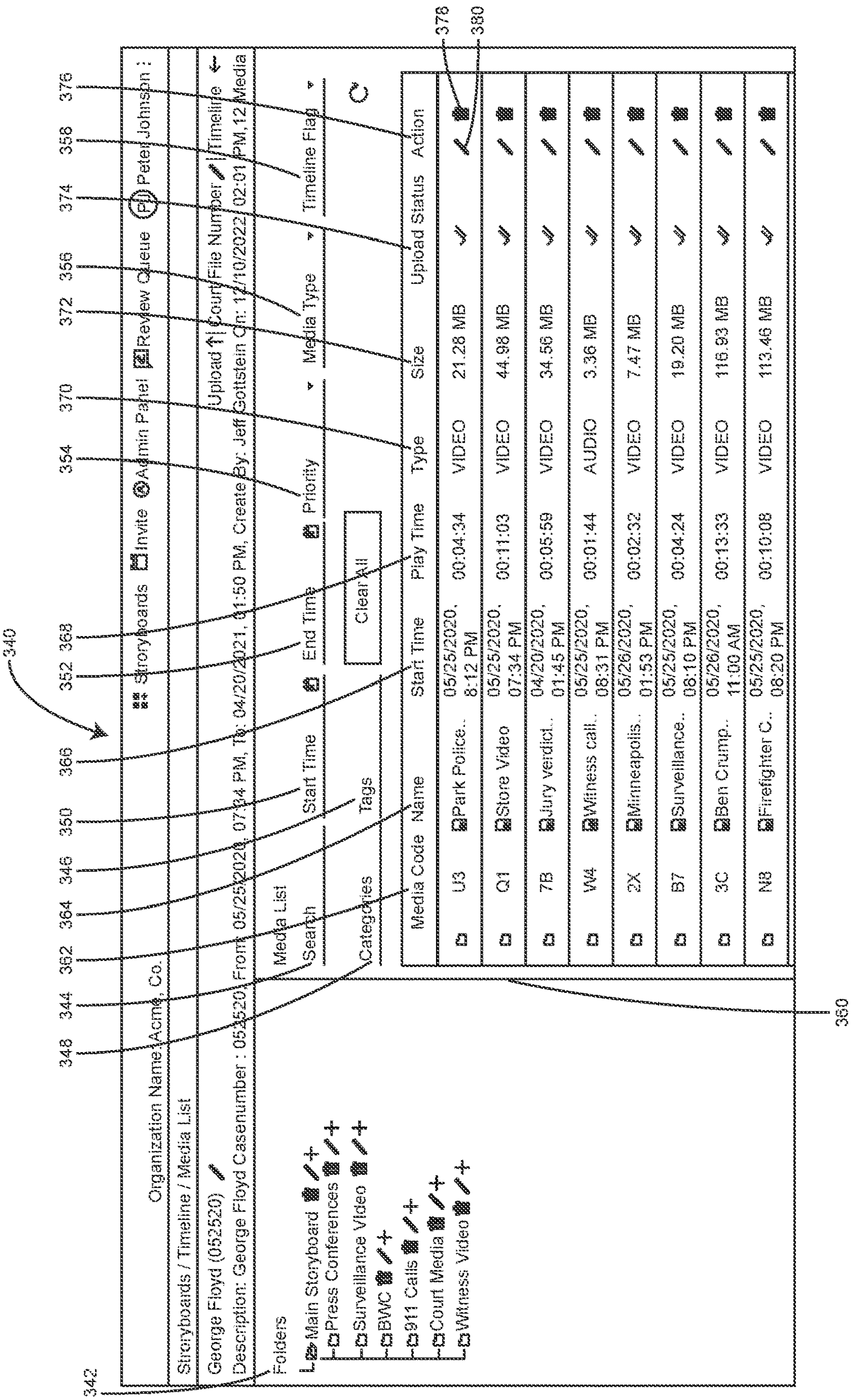
FIG. 14 is a diagrammatic screenshot of an edit media function of a storyboard application in accordance with one embodiment.

Referring back to FIG. 8, if a user selects edit media option 262, the screen will transition to that shown in FIG. 14, which is a diagrammatic screenshot of an edit media function of a storyboard application in accordance with one embodiment. Screen 340 includes a listing of all media associated with a particular incident. As shown in screen 340, a folders listing 342 is provided showing the various folders that contain files or media associated with the incident. Additionally, a search functionality in provided using search window 344. The search may be based on individual keywords or one or more tags provided in tag window 346. The search may also employ categories provided in category window 348 as well as various start or stop times provided in respective windows 350, 352, priority 354, media type 356, and/or timeline flag 358. As can be appreciated, the searching can be based on any combination of these various fields. A media display window 360 lists the various media files associated with the incident. Preferably, a media code is provided at column 362 as well as a name of the media file at column 364. Start time and play time are provided at columns 366, and 368, respectively. Media type is listed in column 370 and the size of the media file is listed at column 372. At column 374, the upload status of a particular media file is shown. This upload status may indicate that the file has been completely uploaded into the storyboard application, is presently being uploaded into the storyboard application, or has not yet been uploaded into the storyboard application. Additionally, an action column 376 is also provided that includes a pair of actions. One action 378 allows the user to delete the particular media file from the timeline. Additionally, user interface element 380 allows the user to edit the media. When the user selects the edit media user interface element 380 in screen 340, the application will transition to that shown in FIG. 15.

Figure 15:
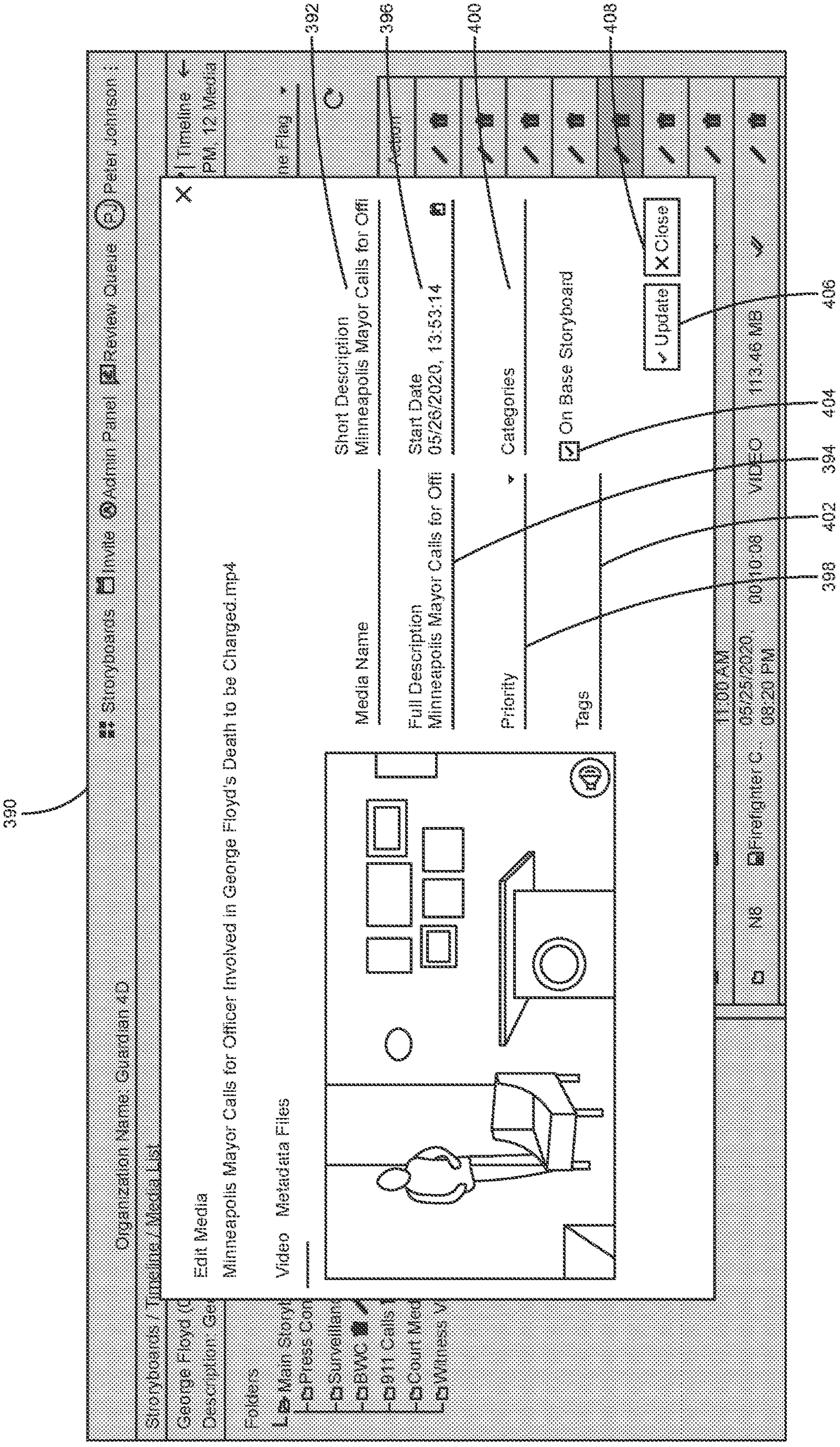
FIG. 15 is a diagrammatic screenshot of an edit media user interface presented to a user when the user clicks on an edit action for a particular media file.

FIG. 15 is a diagrammatic screenshot of an edit media user interface presented to a user when the user clicks on an edit action 380 (shown in FIG. 14) for a particular media file. In the illustrated example, screen 390 shows that the user has chosen to edit media for a video clip entitled "Minneapolis Mayor calls for officer involved in George Floyd's death to be charged.mp4". As shown in FIG. 15, the media name can include both a short description 392 as well as full description 394. An additional window 396 lets the user set the start date and time of the video. Further, field 398 allows the user to set a priority of the media file and field 400 allows the user to set a category for the particular media file. Field 402 allows the user to enter one or more tags relative to the media, and check box 404 allows the user to set whether the media file is presented on the base storyboard. When the information has been edited to the user's satisfaction, button 406 is pressed by the user and the information is updated for the selected media file. In the event that the user does not wish to update the information, button 408 can be selected to simply close the edit media interface.

Figure 16:
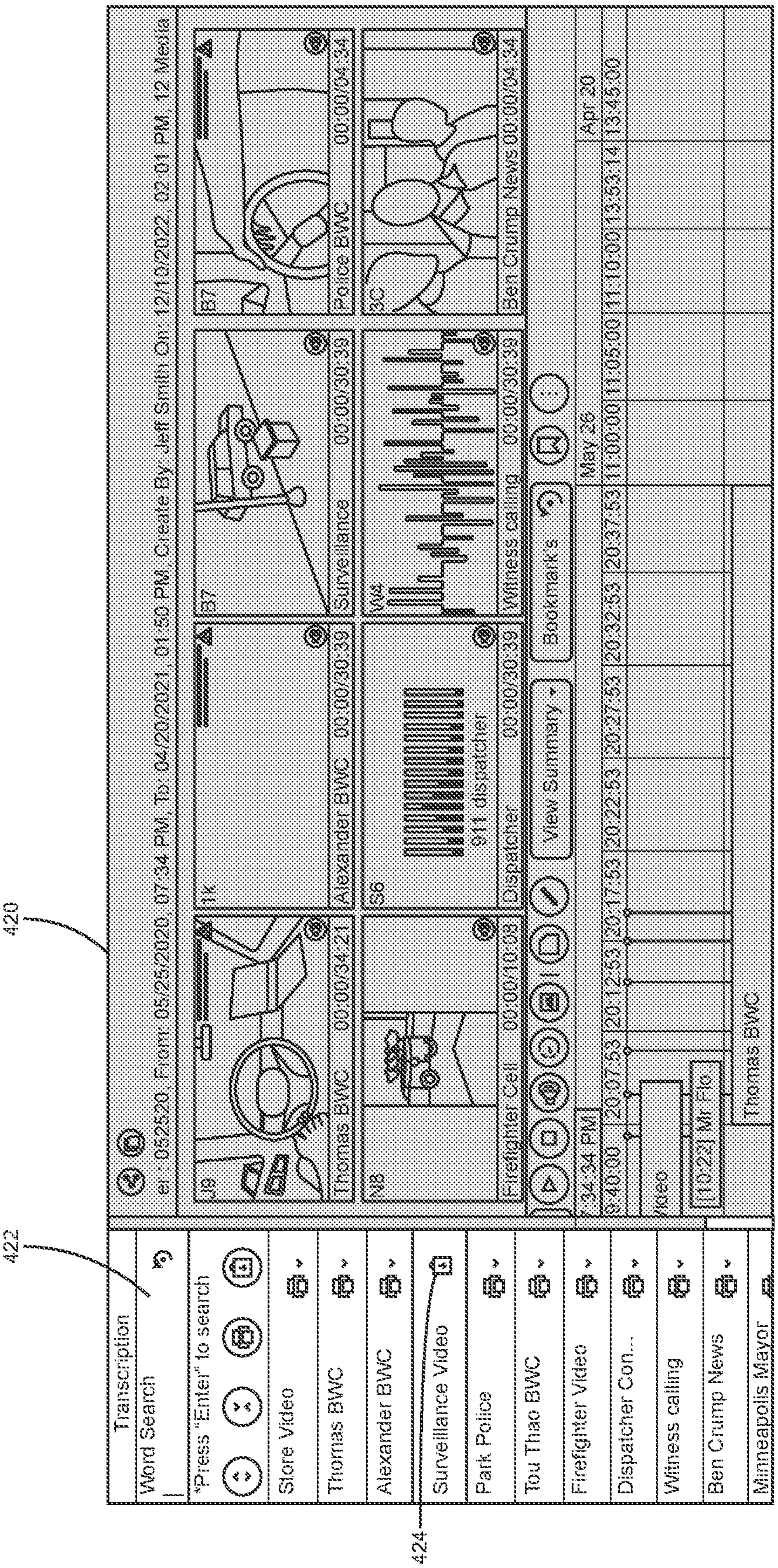
FIG. 16 is a diagrammatic screenshot of a transcription user interface for a storyboard application in accordance with one embodiment.

FIG. 16 is a diagrammatic screenshot of a transcription user interface for a storyboard application in accordance with one embodiment. A listing 422 on the left side of the interface 420 shows the media files that have transcriptions available. To create a transcription, the user presses the arrow down symbol next to the file at the left. In FIG. 16, an arrow down symbol for the surveillance video is illustrated at reference numeral 424. Any file that has a printer and arrow down icon has a transcription available to print or download. When the user selects the create transcription file, all audio from the selected media file will be automatically fed to a speech recognition module to convert utterances to words. As can be appreciated, when all or substantially all of the media files for a particular incident have transcriptions, powerful searching is enabled. Additionally, since automated transcription is not yet 100% error-proof, embodiments described herein provide a transcription editing function that allows the user to manually edit the transcription. When this is done, the system provides a display of the original transcribed text as well as the edited text. The transcribed text can also be overlayed upon a video file similar to close captioning. Additionally, custom subtitles or text can be placed on the video at any desired location (top, bottom, etc.). These custom subtitles are considered custom in that they are generated by the user. They may be placed on the video along with or instead of the transcription text.

Figure 17:
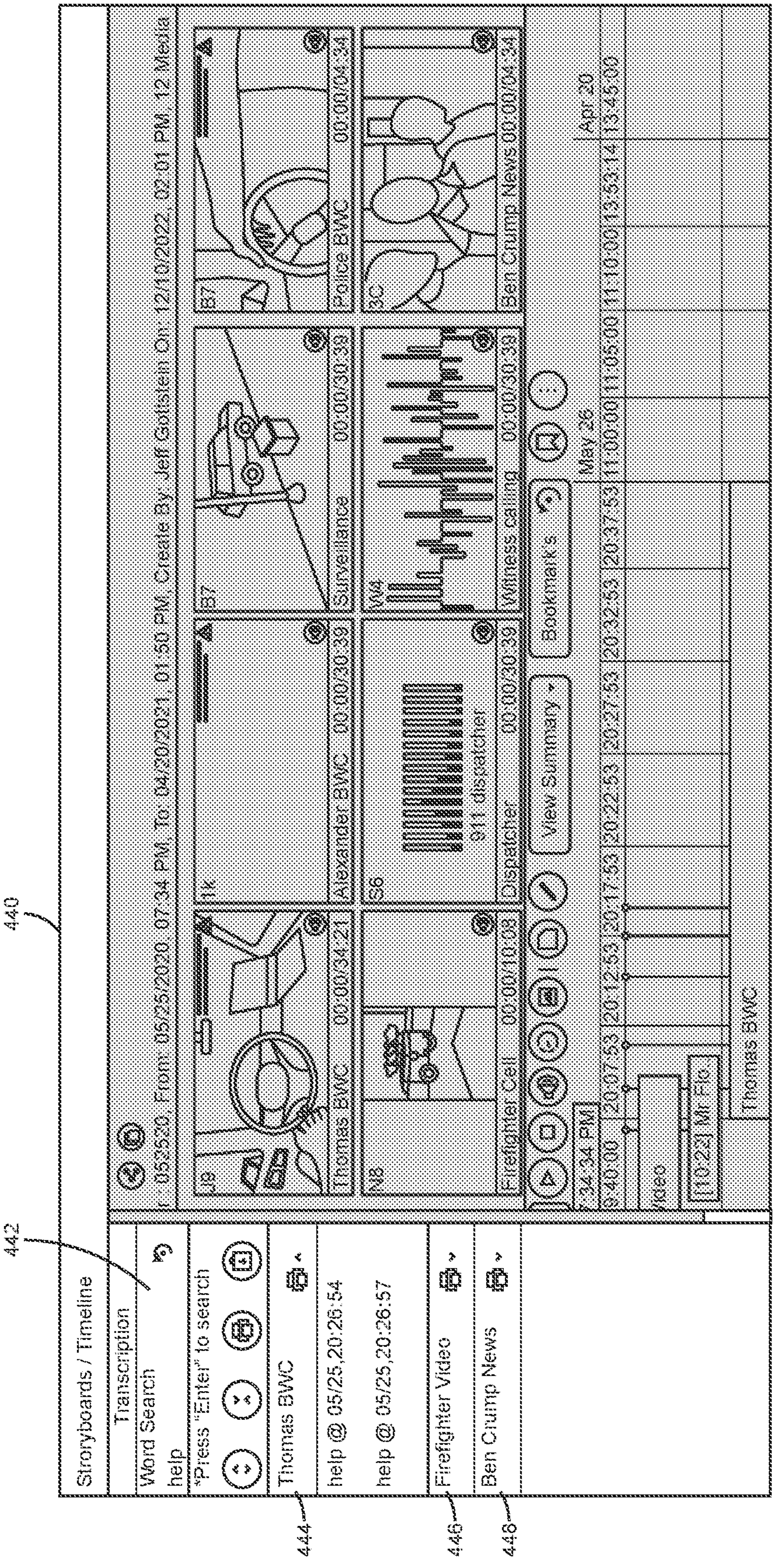
FIG. 17 is a diagrammatic screenshot of a word search among transcriptions of media files for a particular incident.

FIG. 17 is a diagrammatic screenshot of a word search among transcriptions of media files for a particular incident. Screenshot 440 includes a word search box 442 in which the user has typed the word "help". As a result, the search function has identified three media files 444, 446, and 448 that were searched. In the identified media file 444, the word "help" is identified at particular times in the media file. This can be useful to allow the user to quickly move the video to the location in the video where the utterance is heard.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the FIGURES show a number of blocks with functionality ascribed to each block. It will be noted that fewer blocks can be used so the functionality is performed by fewer components. Also, more blocks can be used with the functionality distributed among more components.

It will also be noted that the automatic incident compilation system described herein, or portions of it, can be located and/or executed on a wide variety of different devices. Some of these devices include servers, desktop computers, laptop computers, tablet computers, or other mobile devices such as palm top computers, cell phones, smartphones, multi-media players, personal digital assistance, etc.

Figure 18:
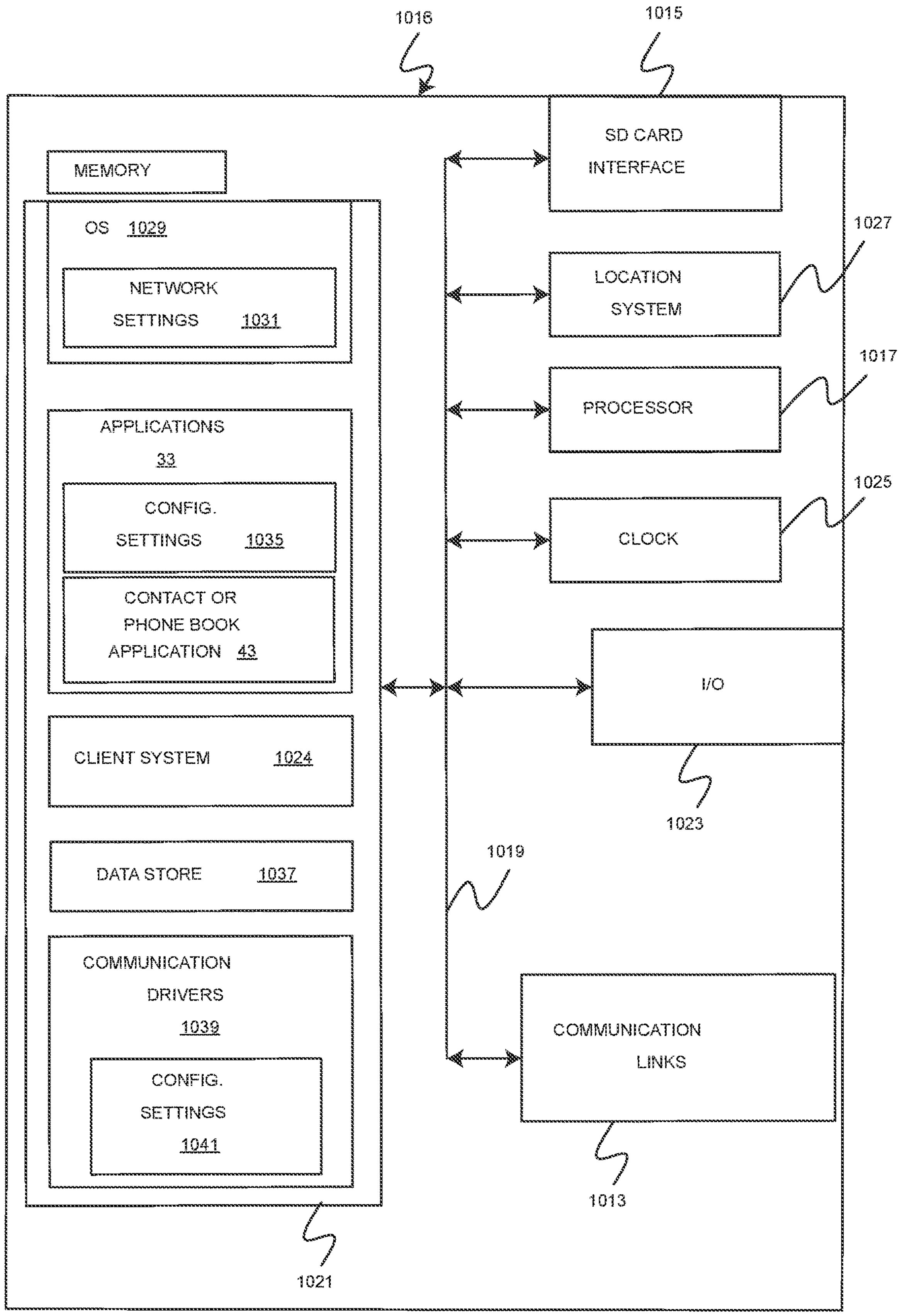
FIG. 18 is a block diagram showing a mobile device that can be used with an automatic incident compilation system in accordance with an embodiment of the present invention.
Figure 19:
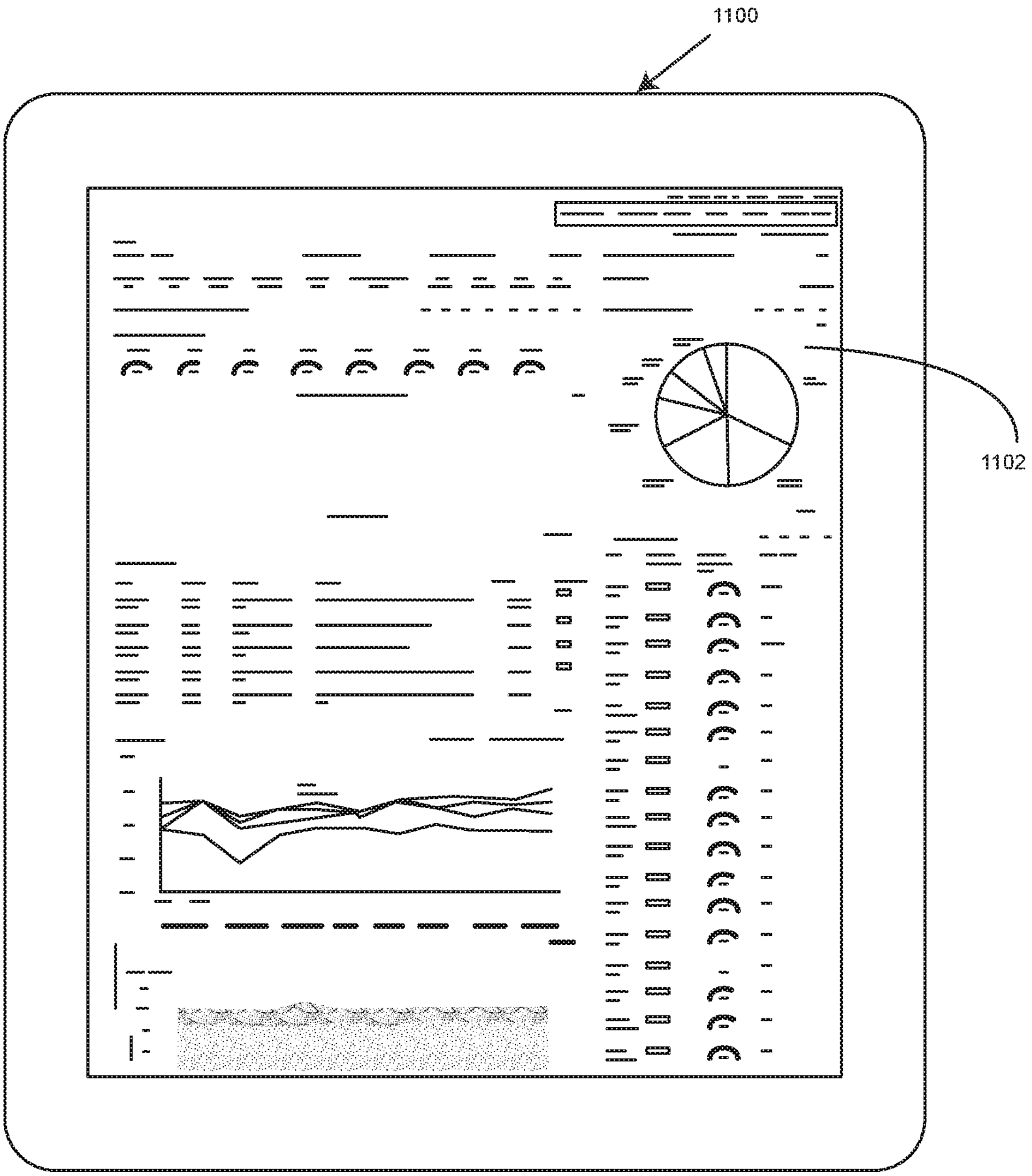
FIGS. 19-20 show examples of mobile devices.
Figure 20:
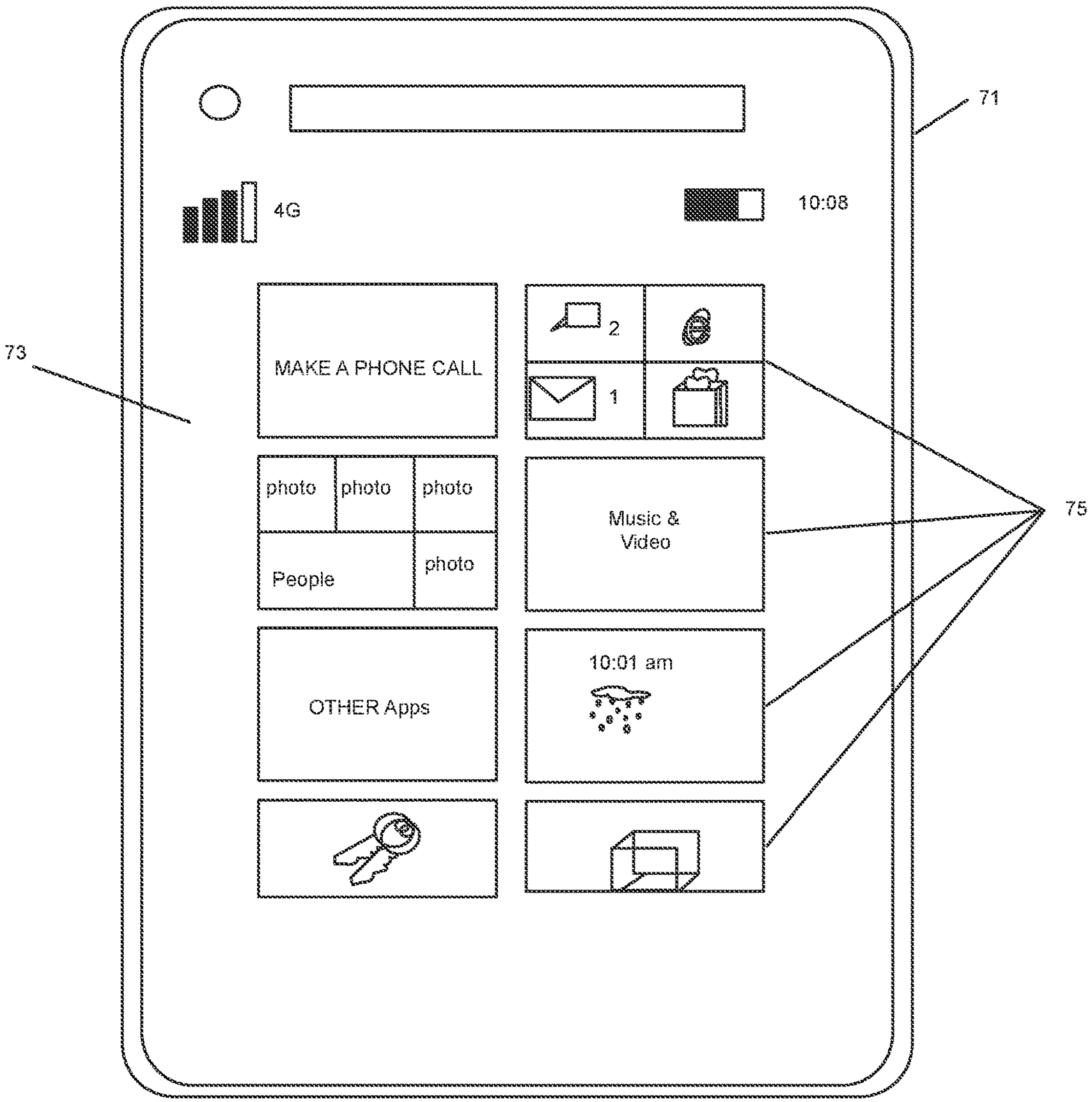

FIG. 18 is a simplified block diagram of one illustrative embodiment of a handheld or mobile computing device that can be used as a user's or client's handheld device 1016 in which the present system (or parts of it) can be deployed. FIGS. 19-20 are examples of handheld or mobile devices.

FIG. 18 provides a general block diagram of the components of a client device 1016 that can run components of the automatic incident compilation system and/or which interacts with it. In the device 1016, a communications link 1013 is provided that allows the handheld device to communicate with other computing devices, and under some embodiments, provides a channel for receiving information automatically, such as by scanning. Examples of communications link 1013 include an infrared port, a serial/USB port, a cable network port such as an Ethernet port, and a wireless network port allowing communications through one of more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 1015. SD card interface 1015 and communication links 1013 communicate with a processor 1017 along a bus 1019 that is also connected to memory 1021 and input/output (I/O) components 1023, as well as clock 1025 and location system 1027.

I/O components 1023, in various embodiments, are provided to facilitate input and output operations. I/O components 1023 of the device 1016 can include input components such as buttons, touch sensors, multi-touch sensors, optical or video sensors, voice sensors, touch screens, proximity sensors, microphones, tilt sensors, and gravity switches and output components such as a display device, a speaker, and/or a printer port. Other I/O components 1023 can be used as well.

Clock 1025 illustratively comprises a real time clock component that outputs a time and date. It can also, illustratively, provide timing functions for processor 1017.

Location system 1027 illustratively includes a component that outputs a current geographical location of device 1016. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 1021 stores operating system 1029, network settings 1031, applications 1033, application configuration settings 1035, data store 1037, communication drivers 1039, and communication configuration settings 1041. Memory 1021 can include all types of tangible volatile and non-volatile computer-readable memory devices. It can also include computer storage media. Memory 1021 stores computer readable instructions that, when executed by processor 1017, cause the processor to perform computer-implemented steps or functions according to the instructions. Device 1016 can have a client system 1024 which can run various video conferencing applications. Processor 1017 can be activated by other components to facilitate their functionality as well.

Examples of the network settings 1031 include things such as proxy information, Internet connection information, and mappings. Application configuration settings 1035 include settings that tailor the application for a specific enterprise or user. Communication configuration settings 1041 provide parameters for communicating with other computers and include items such as GPRS parameters, SMS parameters, connection user names and passwords.

Applications 1033 can be applications that have previously been stored on the device 1016 or applications that are installed during use, although these can be part of operating system 1029, or hosted external to device 1016, as well.

FIG. 19 shows one embodiment in which device 1016 is a tablet computer 1100. Screen 1102 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 1100 can also illustratively receive voice inputs as well.

Tablet 1100 may be useful for a displaying a storyboard or a summary of a storyboard because it is portable and includes a relatively large display that can provide a wealth of information.

Additional examples of device 1016 can be used as well. Device 1016 can be a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1×rtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 20 is similar to FIG. 19 except that the mobile device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the device 1016 are possible.

Figure 21:
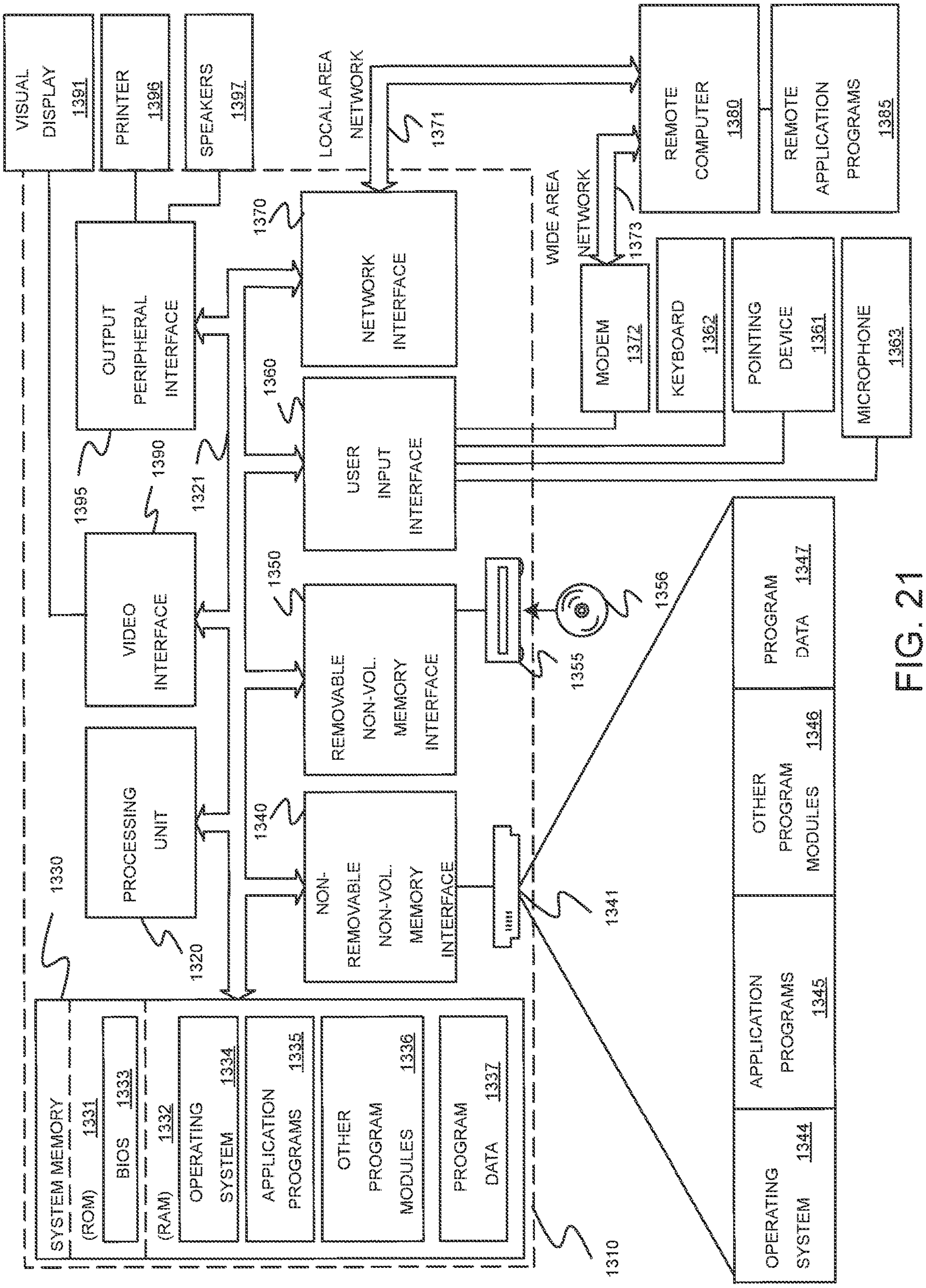
FIG. 21 shows one example of a computing device that can be used in accordance with embodiments of the present invention.

FIG. 21 is one embodiment of a computing environment in which architectures 100, 120, and/or 130, or portions thereof, for example can be deployed. With reference to FIG. 21, an exemplary system for implementing some embodiments includes a general-purpose computing device in the form of a computer 1310. Components of computer 1310 may include, but are not limited to, a processing unit 1320, a system memory 1330, and a system bus 1321 that couples various system components including the system memory to the processing unit 1320. The system bus 1321 may be any of several types of bus structures including a memory bus or memory controller, a peripheral bus, or a local bus using any of a variety of bus structures. By way of example, and not by limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described above can be deployed in corresponding portions of FIG. 21.

Computer 1310 typically includes a variety of computer readable media. Computer readable media can be any available media that can be accessed by computer 1310 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to: RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1310. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1330 includes computer storage media in the form of volatile and/or nonvolatile memory such as read only memory (ROM) 1331 and random access memory (RAM) 1332. A basic input/output system 1333 (BIOS), containing the basic routines that help to transfer information between elements within computer 810, such as during start-up, is typically stored in ROM 1331. RAM 1332 typically contains data and/or program modules that are immediately accessible to and/or presently being operated on by processing unit 1320. By way of example, and not limitation, FIG. 21 illustrates operating system 1334, application programs 1335, other program modules 1336, and program data 1337.

The computer 1310 may also include other removable/non-removable volatile/nonvolatile computer storage media. By way of example only, FIG. 21 illustrates a hard disk drive 1341 that reads from or writes to non-removable, nonvolatile magnetic media, a magnetic disk drive 1350 that reads from or writes to a removable, nonvolatile magnetic disk 1352, and an optical disk drive 1355 that reads from or writes to a removable, nonvolatile optical disk 1356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1341 is typically connected to the system bus 1321 through a non-removable memory interface such as interface 1340, and magnetic disk drive 1341 and optical disk drive 1355 are typically connected to the system bus 1321 by a removable memory interface, such as interface 1350.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 21, provide storage of computer readable instructions, data structures, program modules and other data for the computer 1310. These computer-readable instructions, when executed by processing unit 1320 provide the various automatic incident compilation functions as well as the various storyboard manipulation functions described above.

In FIG. 21, for example, hard disk drive 1341 is illustrated as storing operating system 1344, application programs 1345, other program modules 1346, and program data 1347. Note that these components can either be the same as or different from operating system 1334, application programs 1335, other program modules 1336, and program data 1337. Operating system 1344, application programs 1345, other program modules 1346, and program data 1347 are given different numbers here to illustrate that, at a minimum, they are different copies.

A user may enter commands and information into the computer 1310 through input devices such as a keyboard 1362, a microphone 1363, and a pointing device 1361, such as a mouse, trackball or touch pad. Other input devices (not shown) may include a joystick, game pad, satellite dish, scanner, or the like. These and other input devices are often connected to the processing unit 1320 through a user input interface 1360 that is coupled to the system bus, but may be connected by other interface and bus structures, such as a parallel port, game port or a universal serial bus (USB). A visual display 1391 or other type of display device is also connected to the system bus 1321 via an interface, such as a video interface 1390. In addition to the monitor, computers may also include other peripheral output devices such as speakers 1397 and printer 1396, which may be connected through an output peripheral interface 1395.

The computer 1310 is operated in a networked environment using logical connections to one or more remote computers, such as a remote computer 1380. The remote computer 1380 may be a personal computer, a hand-held device, a server, a router, a network PC, a peer device or other common network node, and typically includes many or all of the elements described above relative to the computer 1310. The logical connections depicted in FIG. 21 include a local area network (LAN) 1371 and a wide area network (WAN) 1373, but may also include other networks. Such networking environments are commonplace in offices, enterprise-wide computer networks, intranets and the Internet.

When used in a LAN networking environment, the computer 1310 is connected to the LAN 1371 through a network interface or adapter 1370. When used in a WAN networking environment, the computer 1310 typically includes a modem 1372 or other means for establishing communications over the WAN 1373, such as the Internet. The modem 1372, which may be internal or external, may be connected to the system bus 1321 via the user input interface 1360, or other appropriate mechanism. In a networked environment, program modules depicted relative to the computer 1310, or portions thereof, may be stored in the remote memory storage device. By way of example, and not limitation, FIG. 21 illustrates remote application programs 1385 as residing on remote computer 1380. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the present invention has been described with reference to preferred embodiments, workers skilled in the art will recognize that changes may be made in form and detail without departing from the spirit and scope of the invention.

What is claimed is:

1. An automatic incident compilation system comprising:

a media facilitator configured to receive a first media file related to an incident from a first device, the first media file having first media file time information, the media facilitator being configured to receive a second media file related to the incident from a second device, the second media file having second media file time information, wherein the media facilitator is configured to store the first media file and second media file in cloud storage;

an application server communicatively coupled to the media facilitator, the application server having a processor and memory containing instructions that, when executed, cause the processor to provide a storyboard application to a user, the storyboard application including:

a storyboard creation user interface that is configured to allow a user to generate a user-customized display of the incident based on the plurality of media files; and wherein the processor is configured to cause the storyboard application to change time information of one of the first and second media files based on time information of the other of the first and second media files and content of the other of the first and second media files; and wherein the first device is selected from the group consisting of a cell phone camera; a dash camera; a body camera; a security camera; and a doorbell camera and wherein the incident has a defined location and time, and wherein the first and second devices are present at the defined location at the same time.

2. The automatic incident compilation system of claim 1, and further comprising a user-interface element that, when selected, causes the storyboard application to receive a user comment that is associated with a particular media file.

3. The automatic incident compilation system of claim 2, wherein the comment is associated with a particular time of the particular media file.

4. The automatic incident compilation system of claim 1, and further comprising a user-interface element that, when selected, causes the storyboard application to synchronize time of a particular media file with time of a selected media file.

5. The automatic incident compilation system of claim 4, and further comprising a user interface element that, when selected, provides a summary generation user interface to the user.

6. The automatic incident compilation system of claim 5, and further comprising a user interface element that, when selected, provides a summary layout function to the user.

7. The automatic incident compilation system of claim 1, wherein the processor and memory are cloud compute resources.

8. The automatic incident compilation system of claim 1, wherein the processor is configured to automatically transcribe audio of at least one of the first and second media files into associated text.

9. The automatic incident compilation system of claim 8, wherein the associated text includes time information for each word of the associated text, the time information indicating a time in the media file when an utterance associated with the word occurred.

10. The automatic incident compilation system of claim 8, wherein the processor is configured to provide a search functionality over all transcribed text associated with the incident.

11. The automatic incident compilation system of claim 10, wherein a user-specified search term results in a listing of all media files associated with the incident that include the user-specified search term.

12. The automatic incident compilation system of claim 11, wherein the search results include time information for each search result indicating a time of a particular utterance in a particular media file.

13. The automatic incident compilation system of claim 1, wherein the content of the other of the first and second media file is a sound.

14. The automatic incident compilation system of claim 13, wherein the sound is an utterance.

* * * * *